(12) United States Patent
Kim et al.

(10) Patent No.: US 10,135,816 B2
(45) Date of Patent: Nov. 20, 2018

(54) ELECTRONIC DEVICE AND METHOD OF TRANSCEIVING DATA

(71) Applicant: SAMSUNG ELECTRONICS CO., LTD., Suwon-si (KR)

(72) Inventors: Hyun-June Kim, Seoul (KR); Hyuk-Joong Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 14/812,006

(22) Filed: Jul. 29, 2015

(65) Prior Publication Data
US 2016/0036810 A1 Feb. 4, 2016

(30) Foreign Application Priority Data
Jul. 29, 2014 (KR) .................. 10-2014-0096476

(51) Int. Cl.
| G06F 7/04 | (2006.01) |
| H04L 29/06 | (2006.01) |
| H04L 29/08 | (2006.01) |
| H04W 12/06 | (2009.01) |
| G06F 15/16 | (2006.01) |

(52) U.S. Cl.
CPC .......... *H04L 63/0861* (2013.01); *H04L 67/12* (2013.01); *H04L 67/14* (2013.01); *H04L 67/141* (2013.01); *H04L 67/32* (2013.01); *H04W 12/06* (2013.01)

(58) Field of Classification Search
CPC ..... H04L 63/0861; H04L 67/32; H04W 12/06
See application file for complete search history.

(56) References Cited

U.S. PATENT DOCUMENTS

| 8,738,925 | B1* | 5/2014 | Park | ................. H04B 7/26 713/186 |
| 2003/0005310 | A1* | 1/2003 | Shinzaki | ................. G06F 21/32 713/186 |
| 2003/0126121 | A1* | 7/2003 | Khan | ................. G06F 17/30247 |
| 2004/0010697 | A1* | 1/2004 | White | ................. G06F 21/31 713/186 |
| 2004/0014457 | A1* | 1/2004 | Stevens | ................. G06Q 20/04 455/414.1 |
| 2006/0256959 | A1* | 11/2006 | Hymes | ................. H04M 1/26 379/433.04 |
| 2008/0114988 | A1* | 5/2008 | Lisanke | ................. H04L 9/0866 713/186 |
| 2009/0061901 | A1* | 3/2009 | Arrasvuori | ............. G06Q 30/00 455/456.3 |
| 2009/0147933 | A1* | 6/2009 | O'Sullivan | ....... H04M 3/42357 379/88.22 |
| 2010/0008506 | A1 | 1/2010 | Park et al. | |

(Continued)

Primary Examiner — Gary S Gracia
(74) Attorney, Agent, or Firm — Sughrue Mion, PLLC

(57) ABSTRACT

An electronic device and a method of transceiving data are disclosed. A method of transceiving data by an electronic device includes: storing one or more pieces of input biometric information; searching for one or more electronic devices in response to the input of the same biometric information as the stored biometric information; connecting a communication session with the one or more searched electronic devices; and transceiving data with the one or more electronic devices through the connected communication session.

18 Claims, 14 Drawing Sheets

(56) References Cited

U.S. PATENT DOCUMENTS

| | | | |
|---|---|---|---|
| 2010/0316262 A1* | 12/2010 | Kuwahara | G06K 9/00979 382/115 |
| 2010/0321151 A1* | 12/2010 | Matsuura | G06F 17/30032 340/5.52 |
| 2013/0006784 A1* | 1/2013 | Krauss | H04L 9/3231 705/18 |
| 2013/0036480 A1* | 2/2013 | Anderson | H04L 63/0853 726/30 |
| 2013/0040606 A1* | 2/2013 | Naccache | H04L 63/0492 455/411 |
| 2013/0196629 A1* | 8/2013 | Masuoka | H04W 12/06 455/411 |
| 2013/0205377 A1* | 8/2013 | Cheng | H04L 63/0861 726/7 |
| 2013/0254533 A1* | 9/2013 | Welch | G06F 21/32 713/155 |
| 2014/0007223 A1* | 1/2014 | Han | G06F 21/32 726/16 |
| 2014/0013352 A1 | 1/2014 | Shavit et al. | |
| 2014/0013424 A1 | 1/2014 | Lv | |
| 2014/0230018 A1* | 8/2014 | Anantharaman | H04L 63/0861 726/4 |
| 2014/0325594 A1* | 10/2014 | Klein | H04L 63/08 726/2 |

\* cited by examiner

ELECTRONIC DEVICE AND METHOD OF TRANSCEIVING DATA

CROSS-REFERENCE TO RELATED APPLICATION

This application claims priority to Korean Application Serial No. 10-2014-0096476, which was filed in the Korean Intellectual Property Office on Jul. 29, 2014, the entire content of which is hereby incorporated by reference in its entirety.

FIELD

Apparatuses and methods consistent with exemplary embodiments relate to an electronic device and a method of transceiving data.

BACKGROUND

Currently, various services and additional functions provided by portable devices are gradually expanding. In order to increase an effective value of the electronic device and meet various demands of users, various applications executable by the electronic device have been developed. Accordingly, at present, at least several to hundreds of applications can be stored in the electronic device, such as a smart phone, a mobile phone, a notebook Personal Computer (PC), and a tablet PC, which is movable and includes a screen.

Further, the electronic device may transceive stored data with another electronic device by using Bluetooth, Near Field Communication (NFC), and the like. Further, the electronic device may receive biometric information, such as a fingerprint and an iris, from a user through one or more sensors.

SUMMARY

However, the electronic device in the related art has been implemented only with respect to security or authentication of biometric information, and it is impossible to transceive data with another electronic device by using biometric information.

Accordingly, there is demand to transceive data with another electronic device by using biometric information.

Accordingly, various exemplary embodiments of the present disclosure provide an electronic device and a method of transceiving data by using biometric information.

In accordance with an aspect of the present disclosure, a method of transceiving data by an electronic device is provided. The method includes: storing one or more pieces of input biometric information; searching for one or more electronic devices in response to subsequent input of the same biometric information as the stored one or more pieces of input biometric information; establishing a communication session with the one or more searched electronic devices; and transceiving data with the one or more electronic devices through the communication session.

In accordance with another aspect of the present disclosure, a method of transceiving data by an electronic device is provided. The method includes: grouping one or more pieces of biometric information as grouped biometric information and transmitting the grouped biometric information to the server; requesting biometric information from the server in response to an input of biometric information that is a same as that which is included in the grouped biometric information and receiving the requested biometric information; searching for one or more electronic devices by using the input biometric information; and transceiving data with the one or more searched electronic devices by establishing a communication session.

In accordance with another aspect of the present disclosure, an electronic device transceiving data is provided. The electronic device includes: a sensor including one or more sensors which receive one or more pieces of biometric information; a processor configured to search for one or more electronic devices in response to an input, at the one or more electronic devices, of a same biometric information as biometric information received at the electronic device, and configured to control a connection of a communication session with the one or more searched electronic devices; and a communicator configured to transceive data with the one or more electronic devices through the communication session.

In accordance with another aspect of the present disclosure, a system transceiving data is provided. The system includes: a first electronic device configured to group one or more input biometric information as grouped biometric information and transmit the grouped biometric information to a server, and configured to search for one or more second electronic devices in response to an input, at the one or more second electronic devices, of a same biometric information as the biometric information input at the first electronic device; the one or more second electronic devices configured to transmit input biometric information to the server when the biometric information included in the grouped biometric information is input at the one or more second electronic devices; and the server configured to control data transception between the first electronic device and the one or more second electronic device by establishing a communication session between the first electronic device and the one or more searched second electronic devices.

In accordance with another aspect of the present disclosure, a computer readable storage medium that stores a program including operations for controlling data transception of an electronic device is provided. The operations may be analogous to those described above in any of the aforementioned methods of transceiving data by an electronic device.

According to the various exemplary embodiments of the present disclosure, it is possible to provide the electronic device and the method of transceiving data by using biometric information, thereby providing a user with convenience.

Further, according to the exemplary embodiment of the present disclosure, a plurality of electronic devices mutually transceives data by using input biometric information, thereby providing convenience communication service between the electronic devices.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
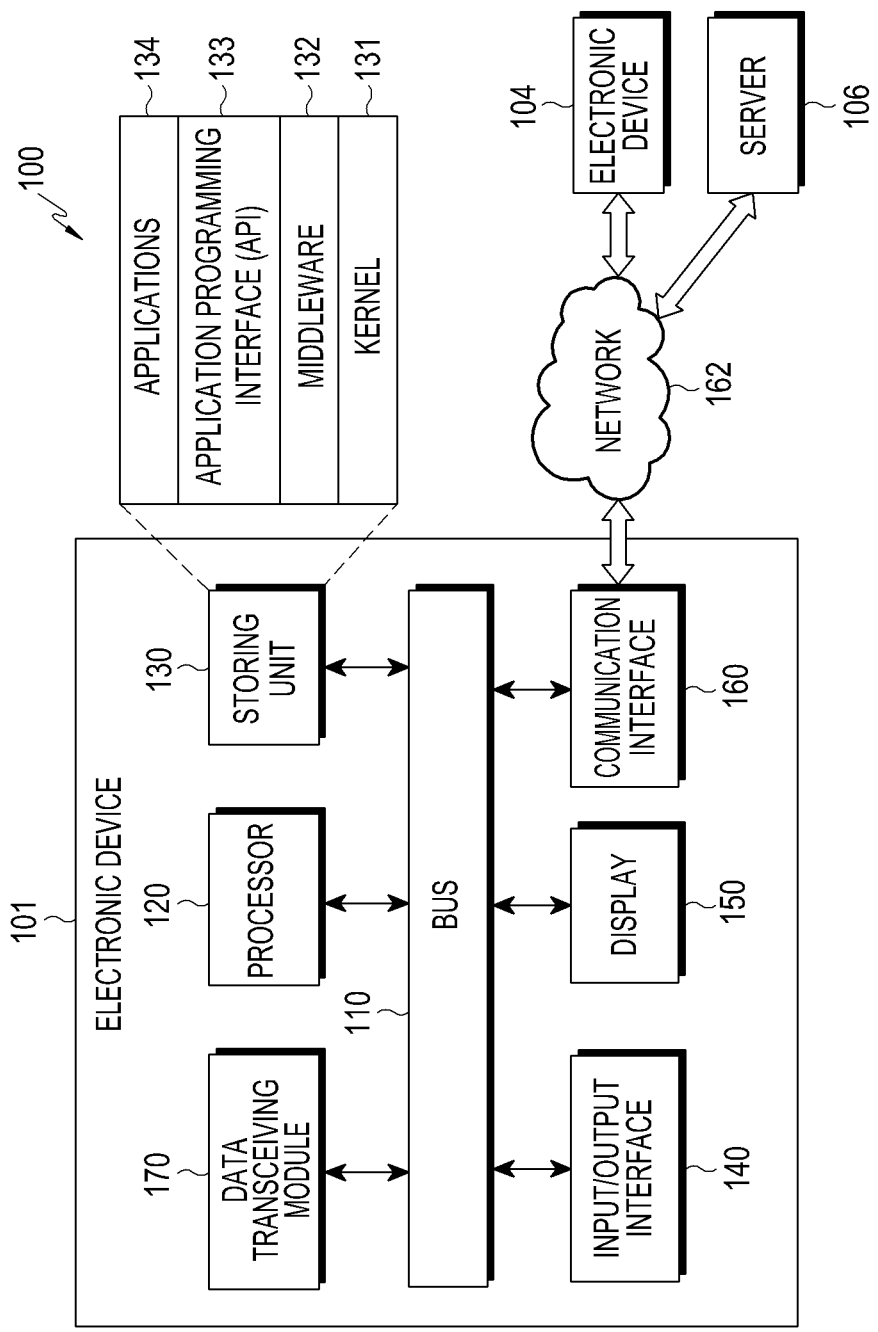
FIG. 1 illustrates a network environment including an electronic device according to various exemplary embodiments of the present disclosure.

Hereinafter, the present disclosure will be described with reference to the accompanying drawings. The present disclosure may have various modifications and exemplary embodiments and thus will be described in detail with reference to specific exemplary embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used in the present disclosure are only used to describe specific exemplary embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present disclosure may be a device including a display control function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic accessory, electronic tattoos, or a smartwatch).

According to some exemplary embodiments, the electronic device may be a smart home appliance with a display control function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some exemplary embodiments, the electronic device may include at least one of various medical appliances (e.g. Magnetic Resonance Angiography (MRA), Magnetic Resonance Imaging (MRI), Computed Tomography (CT) machine, and an ultrasonic machine), navigation devices, Global Positioning System (GPS) receivers, Event Data Recorders (EDRs), Flight Data Recorders (FDRs), automotive infortainment devices, electronic equipments for ships (e.g. navigation equipments for ships, gyrocompasses, or the like), avionics, security devices, head units for vehicles, industrial or home robots, Automatic Teller Machines (ATM) of banking facilities, and Point Of Sales (POSs) of shops.

According to some exemplary embodiments, the electronic device may include at least one of a part of furniture or a building/structure having a display control function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an electronic device according to various exemplary embodiments of the present disclosure will be described with reference to the accompanying drawings. In various exemplary embodiments, the term "user" may indicate a person using an electronic device or a device (e.g. an artificial intelligence electronic device) using an electronic device.

FIG. 1 illustrates a network environment including an electronic device according to various exemplary embodiments of the present disclosure.

Referring to FIG. 1, the electronic device 101 may include a bus 110, a processor 120, a storage unit 130, an input/output interface 140, a display 150, a communication interface 160, and a data transceiving module 170.

The electronic device according to various exemplary embodiments of the present disclosure may include various electronic devices capable of transceiving data, and performing a operation by transmitting or receiving biometric information. The electronic device may include a smart phone, a mobile phone, a notebook computer, a door lock, an air conditioner, a washing machine, a note PC, a tablet PC, a smart TV, and the like.

The bus 110 may be a circuit for connecting the above-described components with one another and transmitting communication (for example, control messages) between the above-described components.

The processor 120 may receive a command from other components (for example, the storage unit 130, the input/output interface 140, the display 150, the communication interface 160, or the data transceiving module 170) through the bus 110, decrypt the received command, and perform calculation or data processing according to the decrypted command.

The storage unit 130 may store commands or data received from or generated by the processor 120 or other components (for example, the input/output interface 140, the display 150, the communication interface 160, and the data transceiving module 170). The storage unit 130 may include programming modules, for example, a kernel 131, a middleware 132, an Application Programming Interface (API) 133, or applications 134. Each of the aforementioned programming modules may be formed of software, firmware, and hardware, or a combination of two or more thereof.

The kernel 131 may control or manage system resources (for example, the bus 110, the processor 120, and the storage unit 130) used for performing operations or functions implemented in the remaining programming modules, for example, the middleware 132, the API 133, and the applications 134. Furthermore, the kernel 131 may provide an interface through which the middleware 132, the API 133, or the applications 134 may access individual component elements of the electronic device 101 to control or manage them.

The middleware 132 may perform a relay function to allow the API 133 or the applications 134 to communicate with the kernel 131 to exchange data. Further, in relation to operation requests received from the applications 134, the middleware 132 may control (for example, scheduling or load-balancing) the requests by using, for example, a method of assigning a priority to use system resources (for example, the bus 110, the processor 120, and the storage unit 130) of the electronic device 101 to at least one application among the applications 134.

The API 133 is an interface by which the applications 134 control functions are provided from the kernel 131 or the middleware 132, and may include, for example, at least one interface or function (for example, a command) for file control, window control, image processing, text control, or the like.

According to various exemplary embodiments, the applications 134 may include a Short Message Service (SMS)/Multimedia Messaging Service (MMS) application, an email application, a calendar application, an alarm application, a health care application (for example, application measuring a quantity of exercise or blood sugar) or an environment information application (for example, an application providing information on pressure, humidity or temperature). Additionally or alternatively, the applications 134 may include an application related to the exchange of information between the electronic device 101 and an external electronic device (for example, an electronic device 104). The application related to the exchange of information may include, for example, a notification relay application for transmitting specific information to the external electronic device or a device management application for managing the external electronic device.

For example, the notification relay application may include a function of transmitting, to the external electronic device (for example, the electronic device 104), notification information generated by other applications of the electronic device 101 (for example, an SMS/MMS application, an e-mail application, a health care application, an environmental information application, and the like). Additionally or alternatively, the notification relay application may receive notification information from, for example, an external electronic device (for example, the electronic device 104) and provide the same to a user. The device management application may manage (for example, install, remove, or update) at least a part of the functions (for example, turning on/off the external electronic device (or some components of the external electronic device) or controlling a brightness of the display) of the external electronic device (for example, electronic device 104) communicating with the electronic device 101, an application executed in the external electronic device, or a service (for example, call service or message service) provided by the external electronic device.

According to various exemplary embodiments, the applications 134 may include an application designated according to an attribute of the external electronic device (for example, the type of electronic device 104). For example, in a case where the external electronic device is an MP3 player, the applications 134 may include an application related to reproduction of music. Similarly, when the external electronic device is a mobile medical device, the applications 134 may include an application related to the health care. According to an exemplary embodiment, the applications 134 may include at least one of an application designated in the electronic device 101 and an application received from an external electronic device (for example, the server 106 or the electronic device 104).

The input/output interface 140 may transfer commands or data, which are input by a user through input/output devices (for example, sensors, keyboards, or touch screens), to the processor 120, the storage unit 130, the communication interface 160, or the data transceiving module 170 through, for example, the bus 110. For example, the input/output interface 140 may provide, to the processor 120, data associated with a user's touch which is input through the touch screen. For example, instructions or data received from the processor 120, the storage unit 130, the communication interface 160, or the data transceiving module 170 through the bus 110 may be output through the input/output devices (for example, a speaker or a display). For example, the input/output interface 140 may output voice data processed by the processor 120 to the user through the speaker.

The display 150 may display various pieces of information (for example, multimedia data and text data) to the user.

The communication interface 160 may establish communication between the electronic device 101 and the external device (for example, the electronic device 104 or the server 160). For example, the communication interface 160 may be connected to a network 162 through wireless communication or wired communication to communicate with the external electronic device. The wireless communication may include at least one of, for example, Wireless Fidelity (WiFi), Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an exemplary embodiment, the network 162 may be a telecommunication network. The communication network may include at least one of a computer network, the Internet, the Internet of things, and a telephone network. According to an exemplary embodiment, a protocol (for example, a transport layer protocol, a data link layer protocol, or a physical layer protocol) for the communication between the electronic device 101 and the external device may be supported by at least one of the applications 134, the application programming interface 133, the middleware 132, the kernel 131, and the communication interface 160.

The data transceiving module 170 may process at least a part of the information obtained from other components (for example, the processor 120, the storage unit 130, the input/output interface 140, or the communication interface 160) and provide the processed information to a user in various ways. For example, the data transceiving module 170 may control at least some functions of the electronic device 101 by using the processor 120 or may operate independently, so that the electronic device 101 may interoperate with other electronic devices (for example, the electronic device 104 or the server 106). Additional information about the data transceiving module 170 will be provided with reference to FIGS. 2 to 14.

Figure 2:
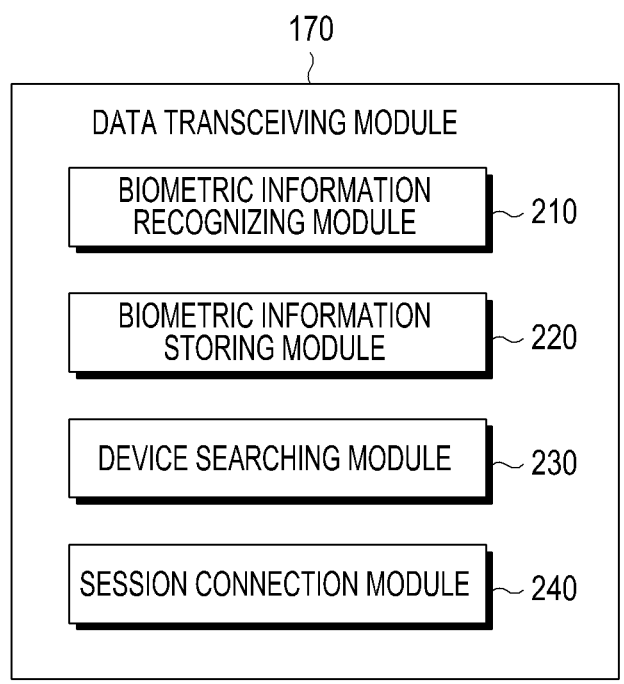
FIG. 2 is a block diagram illustrating a data transceiving module of the electronic device according to various exemplary embodiments of the present disclosure.

FIG. 2 is a block diagram illustrating the data transceiving module of the electronic device according to various exemplary embodiments of the present disclosure.

Referring to FIG. 2, the data transceiving module 170 may include a biometric information recognizing module 210, a biometric information storing module 220, a device searching module 230, and a session connecting module 240.

According to an exemplary embodiment, the biometric information recognizing module 210 may detect or recognize one or more pieces of biometric information about a user through one or more sensors included in the electronic device 101. The biometric information may include an intrinsic value for each person. Further, the biometric information may include intrinsic information for each user, and include at least one of a finger print, a foot print, an iris, a face, a heart rate, brain waves, joints, and a pulse beat. The biometric information may include one or more pieces of biometric information input by a user. The biometric information recognizing module 210 may recognize the biometric information input through the one or more sensors included in the first electronic device 101 and compare the recognized biometric information and pre-stored biometric information.

According to an exemplary embodiment, the biometric information storing module 220 may store one or more pieces of input biometric information in the storage unit 130, or group one or more pieces of input biometric information and store the grouped biometric information. The grouped biometric information may include biometric information about other users. The grouped biometric information may include at least one piece of biometric information about a first user and at least one piece of biometric information about a second user. The first electronic device 101 may group one or more pieces of biometric information about one or more users. The biometric information storing module 210 may read stored biometric information under the control of the processor 120.

According to an exemplary embodiment, when one or more pieces of biometric information are input, the device searching module 230 may compare the one or more pieces of input biometric information and biometric information stored in the storage unit 130, and search for the electronic device inputting the input biometric information. The device searching module 230 may search another electronic device existing in a neighboring area. The device searching module 230 may search for one or more other electronic devices through at least one of broadcasting and multicasting. Further, the device searching module 230 may search for one or more other electronic devices through at least one of a Simple Service Discovery Protocol (SSDP), a Multicast Domain Name System (MDNS), broadcasting, multicasting, and unicasting. Further, the one or more other electronic devices may also be searched through the server. When the one or more other electronic devices exist in a neighboring area, one or more other neighboring electronic devices may be searched through at least one of broadcasting and multicasting. When the one or more other neighboring electronic devices do not exist in the neighboring area, one or more other neighboring electronic devices may be searched through the server. Further, the data transceiving module 170 may encode one or more pieces of input biometric information, and the device searching module 230 may broadcast the encoded biometric information to one or more electronic devices. Then, the device searching module 230 may determine, or discover, one or more electronic devices by using a response signal received in response to the broadcasted biometric information. The device searching module 230 may transmit the biometric information to the server 106, receive a response signal in response to the transmitted biometric information from the server 106, and determine one or more electronic devices based on the received response signal. When the same biometric information as one or more pieces of biometric information stored in the storage unit 130 is input, the response signal may include a signal allowing data transception with the one or more electronic devices.

According to an exemplary embodiment, the session connecting module 240 may control interoperation between the biometric information recognizing module 210, the biometric information storing module 220, and the device searching module 230 included in the data transceiving module 170. According to an exemplary embodiment, the session connecting module 240 may control a connection between one or more elements included in the first electronic device 101. Further, the session connecting module 240 may control a connection between the first electronic device 101 and the server 106 and/or a session connection between the first electronic device 101 and one or more other electronic devices.

Figure 3:
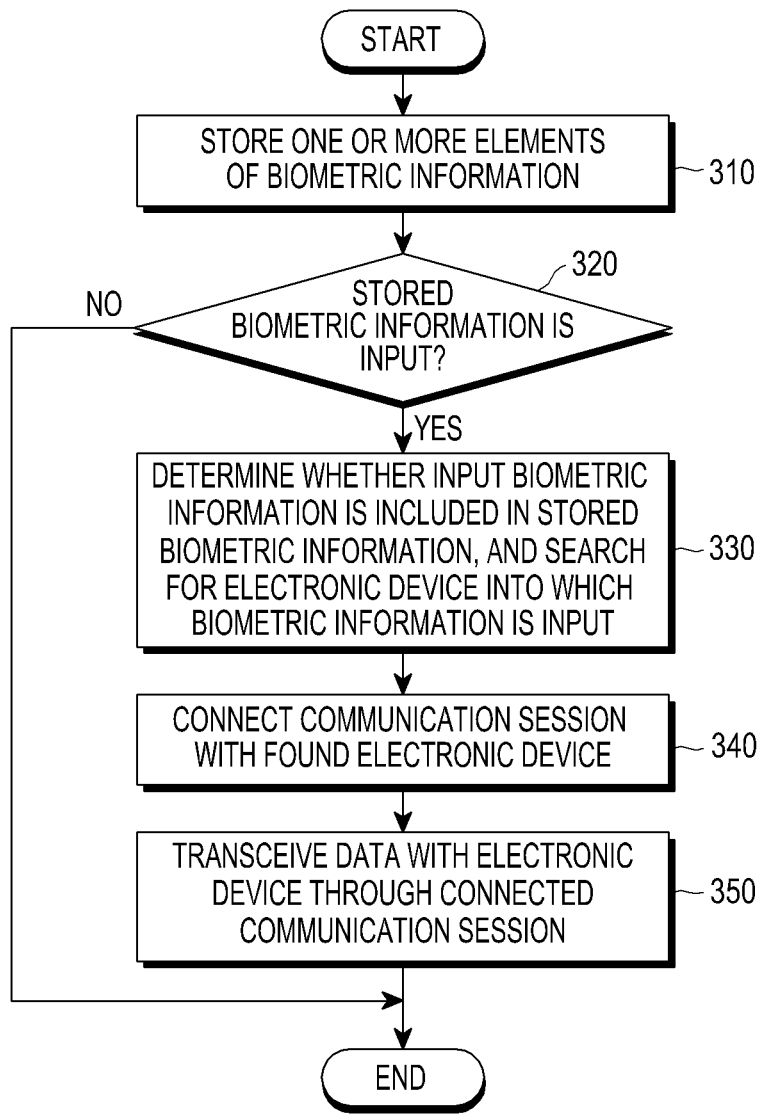
FIG. 3 is a flowchart illustrating data transception of the electronic device according to various exemplary embodiments of the present disclosure.

FIG. 3 is a flowchart illustrating data transception of the electronic device according to various exemplary embodiments of the present disclosure.

The first electronic device 101 may store one or more pieces of biometric information (310). The first electronic device 101 may detect one or more pieces of biometric information input through one or more sensors provided in the first electronic device 101. The first electronic device 101 may group one or more pieces of input biometric information. The biometric information may include intrinsic information for each user. The biometric information may include at least one of a finger print, a foot print, an iris, a face, a heart rate, brain waves, joints, and a pulse beat. The first electronic device 101 may compare the grouped biometric information and any one or more pieces of biometric information, and determine whether the grouped biometric information is the same as the detected one or more pieces of biometric information. The grouped biometric information may include at least one piece of biometric information about a first user and at least one piece of biometric information about a second user. The first electronic device 101 may group one or more pieces of biometric information about one or more users.

When biometric information is input in operation 320, the first electronic device 101 may determine whether the input biometric information is included in the biometric information registered in operation 320, and search for another electronic device to which the biometric information is input (330). When biometric information is input in a state where the one or more pieces of biometric information are stored in operation 310, the first electronic device 101 may determine whether the stored biometric information is the same as the biometric information. When biometric information is input in a state where the one or more pieces of biometric information are grouped and stored in operation 310, the first electronic device 101 may determine whether the grouped biometric information is the same as the biometric information. When the stored biometric information is the same as the biometric information, the first electronic device 101 may search for one or more other electronic devices inputting the biometric information. The one or more other electronic devices may be electronic devices existing in a neighboring area or electronic devices located at a remote distance, and may be electronic devices receiving other biometric information of a group including the input biometric information. The first electronic device 101 may search for one or more electronic devices through at least one of a Simple Service Discovery Protocol (SSDP), a Multicast Domain Name System (MDNS), broadcasting, multicasting, and unicasting. The first electronic device 101 may transmit a request for the electronic device to the server 106, the server 106 may search for the electronic device in response to the received request and transmit the result of the search to the first electronic device 101, and the first electronic device 101 may analyze the result of the search received from the server 106 and search for or determine one or more electronic devices. The first electronic device 101 may encode the stored biometric information, broadcast the encoded biometric information to one or more other electronic devices, and determine the one or more electronic devices by using a response signal received in response to the broadcasted biometric information. Further, the first electronic device 101 may transmit the stored biometric information to the server 106.

The first electronic device 101 may connect a communication session with the other searched electronic devices (340). The first electronic device 101 may connect via a communication session with the other searched electronic devices. The first electronic device 101 may control the two electronic devices so that the communication session is connected between the two or more searched electronic devices. The first electronic device 101 may connect via a communication session with the server 106. The first electronic device 101 may connect via the communication session with the one or more other electronic devices. The communication session may include a session for providing data transection between the connected electronic device.

The first electronic device 101 may transceive data with other electronic devices through the connected communication session (350). The first electronic device 101 may transceive data through the communication session connected with one or more electronic devices. The first electronic device 101 may transceive data with one or more other electronic devices through the communication session connected through the server 106.

Figure 4:
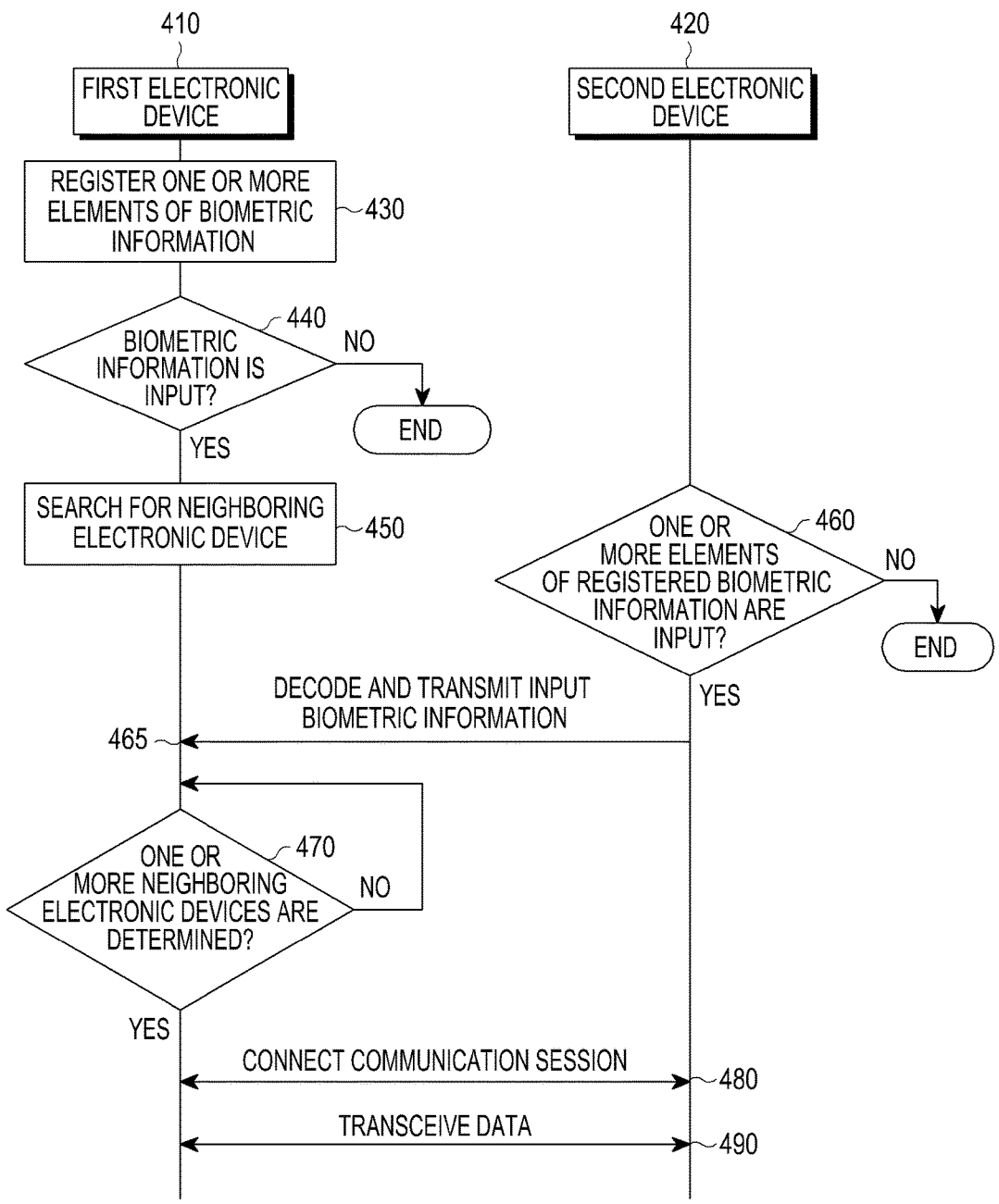
FIG. 4 is a flowchart illustrating data transception between electronic devices according to various exemplary embodiments of the present disclosure.

FIG. 4 is a flowchart illustrating data transception between electronic devices according to various exemplary embodiments of the present disclosure.

A first electronic device 410 may register one or more pieces of biometric information (430). The first electronic device 410 may detect one or more pieces of biometric information input through one or more sensors provided in the first electronic device 410. The first electronic device 410 may group one or more pieces of input biometric information, and store or register the grouped biometric information. The biometric information may include intrinsic information for each user. The biometric information may include at least one of a finger print, a foot print, an iris, a face, a heart rate, brain waves, joints, and a pulse beat. The first electronic device 410 may compare the grouped biometric information and any one or more pieces of biometric information, and determine whether the grouped biometric information is the same as the input one or more pieces of biometric information. The first electronic device 410 may group one or more pieces of biometric information about one or more users. The grouped biometric information may include at least one piece of biometric information about a first user and at least one piece of biometric information about a second user. The first electronic device 410 may transmit the grouped biometric information to a server.

When biometric information is input in operation 440, the first electronic device 410 may determine whether the input biometric information is included in the biometric information registered in operation 430, and search for a second electronic device 420 to which the biometric information is input (450). The first electronic device 410 may encode the grouped biometric information, broadcast the encoded biometric information through at least one of a Simple Service Discovery Protocol (SSDP), a Multicast Domain Name System (MDNS), broadcasting, multicasting, and unicasting, and search for the second electronic device 420 or one or more electronic devices. When biometric information is input in a state where the one or more pieces of biometric information are registered in operation 430, the first electronic device 410 may determine whether the stored biometric information is the same as the biometric information. When biometric information is input in a state where the one or more pieces of biometric information are grouped and registered (or stored) in operation 430, the first electronic device 410 may determine whether the grouped biometric information is the same as the biometric information. When the grouped biometric information is the same as the biometric information, the first electronic device 410 may encode the grouped biometric information and broadcast the encoded grouped biometric information, and the second electronic device 420 receiving the broadcasted encoded biometric information may encode the received biometric information and broadcast the encoded biometric information. Further, the first electronic device 410 may decode the encoded biometric information broadcasted from the second electronic device 420, compare the decoded biometric information with the grouped biometric information, and search for the second electronic device 420.

When biometric information is input in a state where the encoded biometric information has been received from the first electronic device 410 in operation 460, the second electronic device 420 may encode the input biometric information and transmit the encoded biometric information to the first electronic device 410 (465). The second electronic device 420 may decode and analyze the encoded biometric information received from the first electronic device 410, and determine whether the one or more pieces of biometric information input in operation 460 are included in the received biometric information. When it is determined that the biometric information registered to the first electronic device 410 is the same as the one or more biometric information input in operation 460, the second electronic device 420 may encode the one or more pieces of input biometric information and transmit the one or more pieces of encoded biometric information to the first electronic device 410. Further, the second electronic device 420 may establish a connection of a communication session for transceiving data with the first electronic device 410. The second electronic device 420 may be an electronic device which receives other biometric information of a group including the input biometric information.

The first electronic device 410 may determine whether the second electronic device 420 is a neighboring electronic device based on the received biometric information (470). The first electronic device 410 may recognize that the second electronic device 420 is located in a neighboring area, and is an electronic device for transceiving data through the biometric information received from the second electronic device 420. The first electronic device 410 may encode the stored biometric information, broadcast the encoded biometric information to one or more electronic devices existing in a local area, in which the second electronic device 420 is located, and determine the second electronic device 420 or the one or more electronic devices by using a response signal received in response to the broadcasted biometric information. Further, the first electronic device 410 may transmit the stored biometric information to the server.

The first electronic device 410 may connect a communication session with the second electronic device 420 (S480). The first electronic device 410 may connect the communication session with the determined second electronic device 420. Further, when the number of determined second electronic devices is two or more, the first electronic device 410 may control the two electronic devices so that the communication session is connected between the two or more determined electronic devices. The first electronic device 410 may connect the communication session with the server. The first electronic device 410 may connect the communication session with the second electronic device 420. The communication session may include a session for providing data transection between the connected electronic device.

The first electronic device 410 may transceive data with the electronic device through the connected communication session (490). The first electronic device 410 may transceive data through the communication session connected with the second electronic device 420. The first electronic device 410 may transceive data through the communication session connected with the one or more electronic devices through the server.

Figure 5:
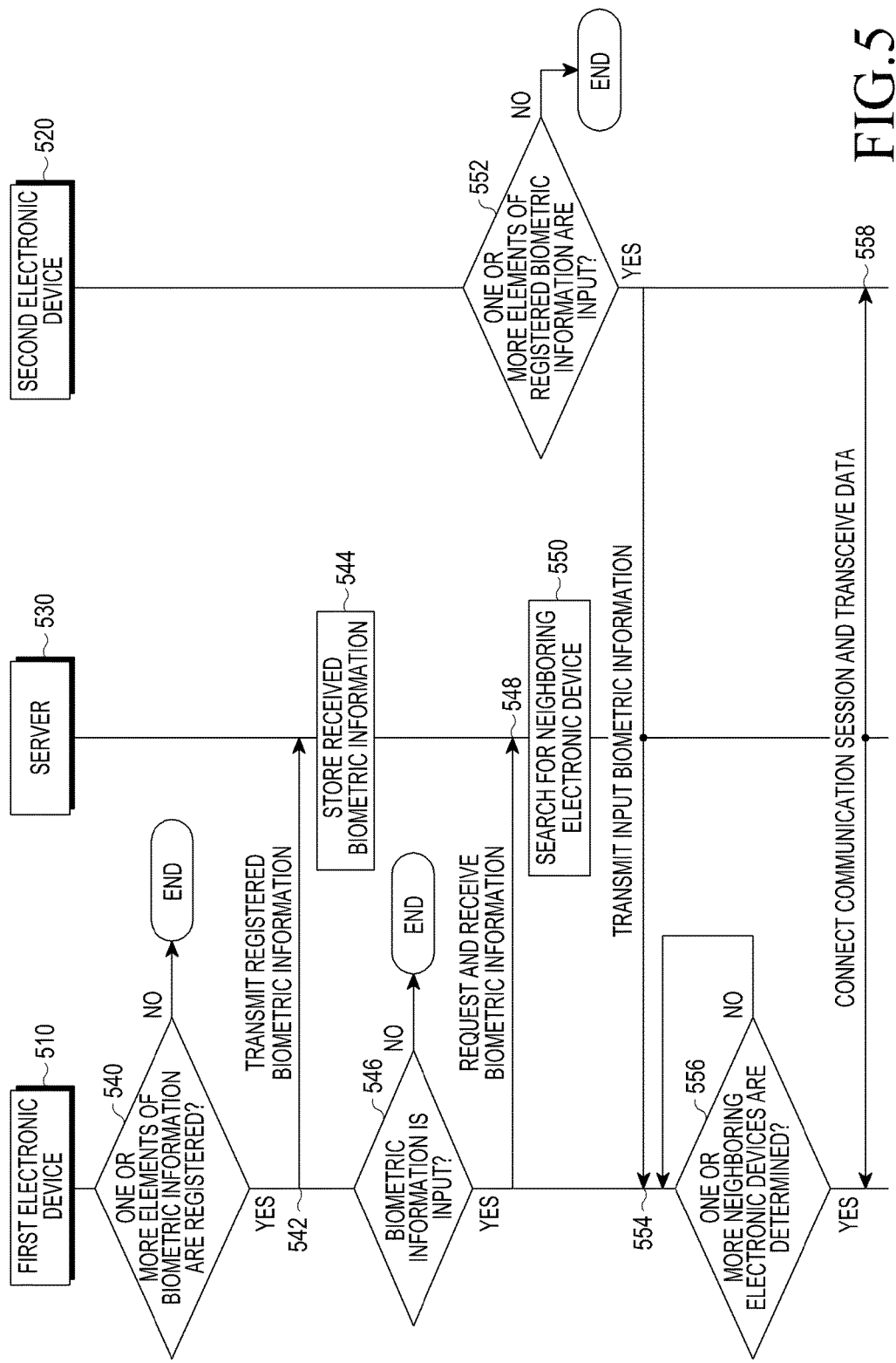
FIG. 5 is a flowchart illustrating data transception between electronic devices through a server according to various exemplary embodiments of the present disclosure.

FIG. 5 is a flowchart illustrating data transception through a server between electronic devices according to various exemplary embodiments of the present disclosure.

A first electronic device 510 may register one or more pieces of biometric information (540). The first electronic device 510 may detect one or more pieces of biometric information input through one or more sensors provided in the first electronic device 510. The first electronic device 510 may group one or more pieces of input biometric information, and store or register the grouped biometric information. The first electronic device 510 may group one or more pieces of input biometric information, and transmit the grouped biometric information. The server 530 may store biometric information received from the first electronic device 510 (544). The biometric information may include intrinsic information for each user. The biometric information may include at least one of a finger print, a foot print, an iris, a face, a heart rate, brain waves, joints, and a pulse beat. The first electronic device 510 may compare the grouped biometric information and any one or more pieces of input biometric information, and determine whether the grouped biometric information is the same as the one or more pieces of input biometric information. The first electronic device 510 may group one or more pieces of biometric information about one or more users. The grouped biometric information may include at least one piece of biometric information about a first user and at least one piece of biometric information about a second user. The first electronic device 510 may transmit the grouped biometric information to a server 530.

When biometric information is input (546), the first electronic device 510 may transmit the input biometric information to the server 530 (548), and the server 530 may receive the biometric information (548), determine whether the biometric information input in operation 546 is included in stored biometric information, and search for the second electronic device 520 to which the biometric information is input (550). The first electronic device 510 may encode the grouped biometric information, and transmit the encoded biometric information to the second electronic device 520 or the server 530 through at least one of a Simple Service Discovery Protocol (SSDP), a Multicast Domain Name System (MDNS), broadcasting, multicasting, and unicasting. When biometric information is received from the first electronic device 510 in a state where the one or more pieces of biometric information registered in operation 544 is stored, the 530 may determine whether the stored biometric information is the same as the biometric information. Further, when biometric information is input in a state where the one or more pieces of biometric information are grouped and registered (or stored) in operation 540, the first electronic device 510 may determine whether the grouped biometric information is the same as the biometric information. When the grouped biometric information is the same as the biometric information, the first electronic device 510 may encode the grouped biometric information and broadcast the grouped biometric information to the second electronic device 520 located in a neighboring area or transmit the grouped biometric information to the server 530, and the second electronic device 520 receiving the encoded grouped biometric information may transmit a response to the broadcasted biometric information to the first electronic device 510 or the server 530, so that the server 530 may search for the second electronic device 520. Further, the server 530 may transmit the result of the search to the first electronic device 510. Further, the first electronic device 510 may search for the second electronic device 520 through the server 530. Further, the first electronic device 510 may determine one or more electronic devices based on a search result received from the server 530.

When biometric information is input in a state where the encoded biometric information received from the first electronic device 510 is received (552), the second electronic device 520 may encode the input biometric information and transmit the encoded biometric information to at least one of the server 530 and the first electronic device 510 (554). The second electronic device 520 may analyze the encoded biometric information received from the first electronic device 510, and determine whether the one or more pieces of biometric information input in operation 552 are included in the biometric information received from the first electronic device 510. The registered biometric information of operation 552 corresponds to the biometric information registered in operation 540. When it is determined that the biometric information registered to the first electronic device 510 is the same as the one or more biometric information input in operation 552, the second electronic device 520 may encode the one or more pieces of input biometric information and transmit the one or more pieces of encoded biometric information to the first electronic device 510. Further, the second electronic device 520 may prepare a connection of a communication session for transceiving data with the first electronic device 510. The second electronic device 520 may be an electronic device receiving other biometric information of a group including the input biometric information. The first electronic device 510 may transmit a request for the second electronic device 520 to the server 530, and the server 530 may search for the second electronic device 520 in response to the received request and transmit a search result to the first electronic device 510, and the first electronic device 510 may analyze the search result received from the server 530 and search for or determine the second electronic device 520 or one or more electronic devices.

The first electronic device 510 may determine whether the second electronic device 520 is an electronic device based on the received biometric information (556). The first electronic device 510 may recognize that the second electronic device 520 is located in a neighboring area, and is an electronic device for transceiving data through the biometric information received from the server 530. Further, the first electronic device 510 may recognize that the second electronic device 520 is located in a neighboring area, and is an electronic device for transceiving data based on the biometric information received from the second electronic device 520. The first electronic device 510 may encode the stored biometric information, broadcast the encoded biometric information to one or more electronic devices existing in a local area, in which the second electronic device 520 is located, and determine the second electronic device 520 or the one or more electronic devices by using a response signal received in response to the broadcasted biometric information. Further, the first electronic device 510 may transmit the stored biometric information to the server 530.

The server 530 may connect a communication session between the first electronic device 510 and the second electronic device 520. The first electronic device 510 may connect the communication session with the determined second electronic device 520 (558). Further, when the number of determined second electronic devices is two or more, the server 530 may control the two electronic devices so that the communication session is connected between the two or more determined electronic devices. The first electronic device 510 may establish the communication session with the server 530. The first electronic device 510 may establish the communication session with the second electronic device 520. The communication session may include a session for providing data transeption between the connected electronic device. The first electronic device 510 may transceive data with other electronic devices via the connected communication session. The first electronic device 510 may transceive data through the communication session connected with the second electronic device 520. The first electronic device 510 may also transceive data through the communication session connected with the second electronic device 520 via the server 530.

Figure 6:
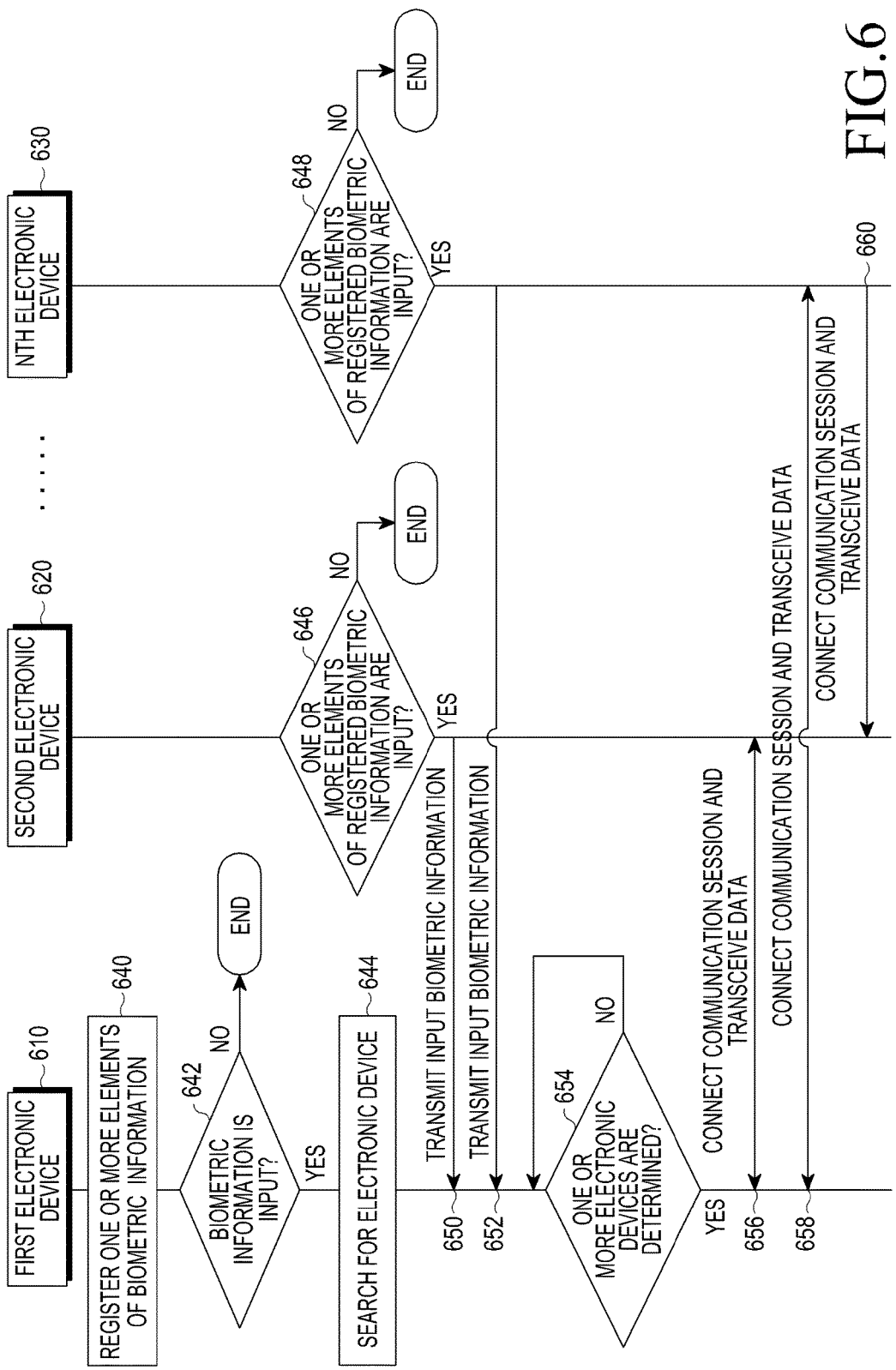
FIG. 6 is a flowchart illustrating data transception between an electronic device according to various exemplary embodiments of the present disclosure and two or more electronic devices.

FIG. 6 is a flowchart illustrating data transception between an electronic device according to various exemplary embodiments of the present disclosure and two or more electronic devices.

A first electronic device 610 may register one or more pieces of biometric information (640). The first electronic device 610 may detect one or more pieces of biometric information input through one or more sensors provided in the first electronic device 610. The first electronic device 610 may group one or more pieces of input biometric information, and store or register the grouped biometric information. The biometric information may include intrinsic information for each user. The biometric information may include at least one of a finger print, a foot print, an iris, a face, a heart rate, brain waves, joints, and a pulse beat. The first electronic device 610 may compare the grouped biometric information and any one or more pieces of biometric information, and determine whether the grouped biometric information is the same as the one or more pieces of biometric information. The first electronic device 610 may group one or more pieces of biometric information about one or more users. The grouped biometric information may include at least one piece of biometric information about a first user and at least one piece of biometric information about a second user. The first electronic device 610 may transmit the grouped biometric information to a server, or encode the grouped biometric information and broadcast the encoded grouped biometric information to at least two electronic devices 620 and 630 located in a local area.

When biometric information is input in operation 642, the first electronic device 610 may determine whether the input biometric information is included in the biometric information registered in operation 640, and search for at least two second electronic devices 620 and 630 to which the biometric information is input (644). The first electronic device 610 may encode the grouped biometric information, broadcast the encoded biometric information through at least one of a Simple Service Discovery Protocol (SSDP), a Multicast Domain Name System (MDNS), broadcasting, multicasting, and unicasting, and search for at least two second electronic devices 620 and 630. When biometric information is input in a state where the one or more pieces of biometric information are registered in operation 640, the first electronic device 610 may determine whether the stored biometric information is the same as the biometric information. When biometric information is input in a state where the one or more pieces of biometric information is grouped and registered (or stored) in operation 640, the first electronic device 610 may determine whether the grouped biometric information is the same as the biometric information. When the grouped biometric information is the same as the biometric information, the first electronic device 610 may encode the grouped biometric information and broadcast the encoded grouped biometric information, and the two electronic devices 620 and 630 receiving the broadcasted biometric information may transmit a response to the encoded biometric information to the first electronic device 610, so that the first electronic device 610 may search for the two electronic devices 620 and 630. Further, the first electronic device 610 may search for the two electronic devices 620 and 630 based on the biometric information received from the two electronic devices 620 and 630.

When biometric information is input in a state where the encoded biometric information has been received from the first electronic device 610 (646, 648), the two electronic devices 620 and 630 may encode the input biometric information and transmit the encoded biometric information to the first electronic device 610 (650, 652). Further, the two electronic devices 620 and 630 may encode the input biometric information and broadcast the encoded biometric information. The second electronic device 620 may analyze the encoded biometric information received from the first electronic device 610, and determine whether the one or more pieces of biometric information input in operation 646 are included in the received biometric information. When it is determined that the biometric information registered to the first electronic device 610 is the same as the one or more biometric information input in operation 646, the second electronic device 620 may encode the one or more pieces of input biometric information and transmit the one or more pieces of encoded biometric information to the first electronic device 610. Similarly, an $N^{th}$ electronic device 630 may analyze the encoded biometric information received from the first electronic device 610, and determine whether one or more pieces of biometric information input in operation 648 are included in the received biometric information. When it is determined that the biometric information registered to the first electronic device 610 is the same as the one or more biometric information input in operation 648, the $N^{th}$ electronic device 630 may encode the one or more pieces of input biometric information and broadcast the one or more pieces of encoded biometric information to the first electronic device 610.

Further, the second electronic device 620 and the $N^{th}$ electronic device 630 may establish a connection of a communication session for transceiving data with the first electronic device 610. The second electronic device 620 and the $N^{th}$ electronic device 630 may be electronic devices receiving other biometric information of a group including the input biometric information. The first electronic device 610 may transmit a request for each of the second electronic device 620 and the $N^{th}$ electronic device 630 to the server, the server may search for the second electronic device 620 and the $N^{th}$ electronic device 630 in response to the received request, and transmit each search result to the first electronic device 610, and the first electronic device 610 may analyze the search result received from the server and search for or determine the second electronic device 620 and the $N^{th}$ electronic device 630.

The first electronic device 610 may determine that the second electronic device 620 and the $N^{th}$ electronic device 630 are the electronic devices that have been inputted with biometric information that is the same as the registered biometric information based on the received biometric information (654). The first electronic device 610 may recognize that the second electronic device 620 and the $N^{th}$ electronic device 630 are located in a neighboring area, and are electronic devices for transceiving data based on the biometric information received from the second electronic device 620 and the $N^{th}$ electronic device 630. The first electronic device 610 may encode the stored biometric information, broadcast the encoded biometric information to one or more electronic devices located in a local area in which the second electronic device 620 and the $N^{th}$ electronic device 630 are located, and determine the second electronic device 620 and the $N^{th}$ electronic device 630 by using a response signal received in response to the broadcasted biometric information. Further, the first electronic device 610 may transmit the stored biometric information to the server.

The first electronic device 610 may establish the communication session with the second electronic device 620 (656). The first electronic device 610 may establish the communication session with the $N^{th}$ electronic device 630 (658). The first electronic device 610 may control the second electronic device 620 and the $N^{th}$ electronic device 630 so that the communication session is connected between the second electronic device 620 and the $N^{th}$ electronic device 630. The first electronic device 610 may establish the communication session with the server. The communication session may include a session for providing data transeption between the connected electronic device. Further, the first electronic device 610 may transceive data with at least one of the second electronic device 620 and the $N^{th}$ electronic device 630 through the connected communication session. The first electronic device 610 may transceive data by using the communication session connected with the second electronic device 620 and the $N^{th}$ electronic device 630 via the server.

Figure 7:
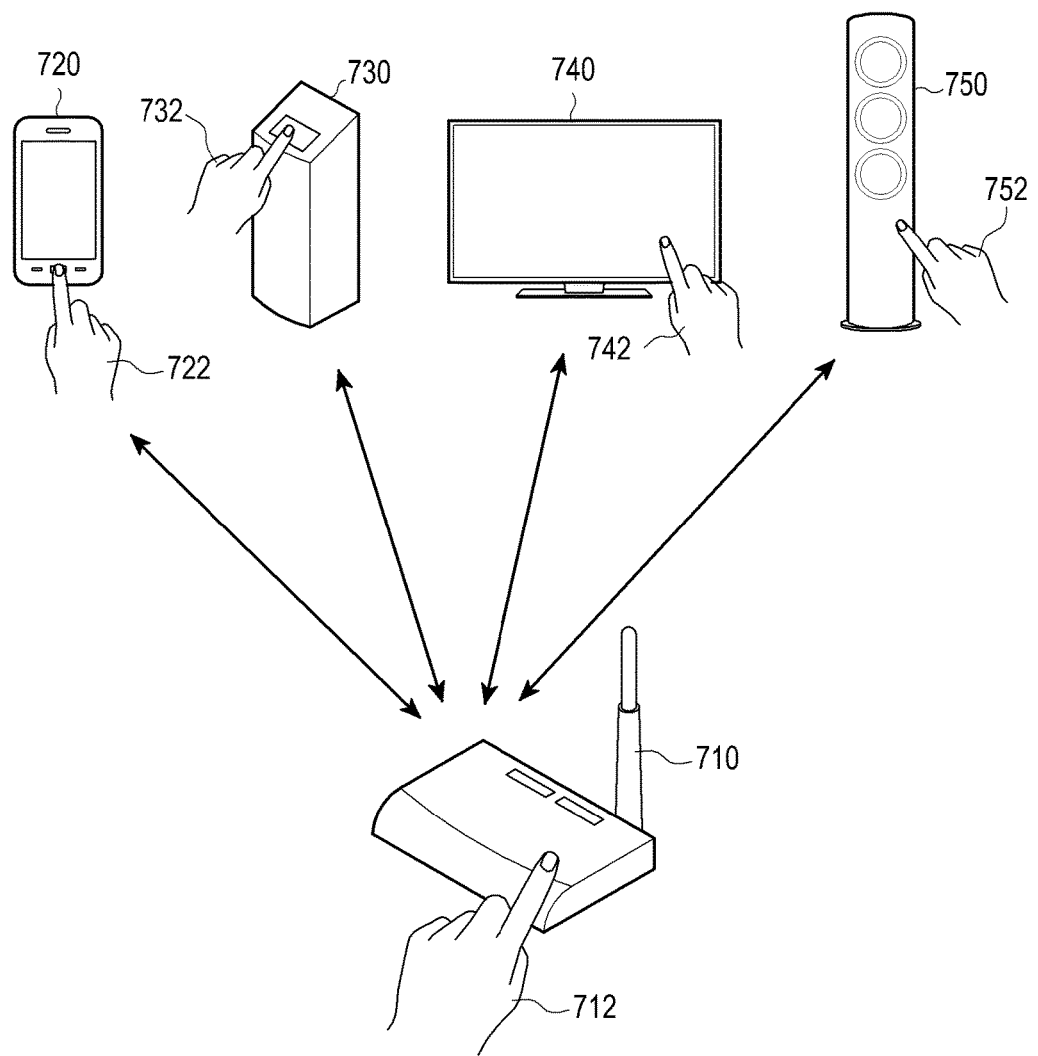
FIG. 7 is a diagram illustrating an example of data transception between an electronic device according to various exemplary embodiments of the present disclosure and two or more electronic devices.

FIG. 7 is a diagram illustrating an example of data transception between an electronic device according to various exemplary embodiments of the present disclosure and two or more electronic devices.

Referring to FIG. 7, a first electronic device 710 may detect one or more pieces of biometric information input through one or more sensors provided in the first electronic device 710. The first electronic device 710 may include a set-top box capable of controlling one or more electronic devices provided at home. The first electronic device 710 may include a sensor which is capable of recognizing biometric information about a user. The first electronic device 710 may include a sensor which is capable of recognizing a finger print of a finger 712. The first electronic device 710 may group one or more pieces of input biometric information, and store or register the grouped biometric information. The biometric information may include intrinsic information for each user. The first electronic device 710 may transmit the grouped biometric information to a server, or encode the grouped biometric information and broadcast the encoded grouped biometric information to a plurality of electronic devices 720, 730, 740, and 750 located in a local area. Further, when the biometric information is input, the first electronic device 710 may determine whether the input biometric information is included in pre-registered biometric information. Further, the first electronic device 710 may search for the plurality of electronic devices 720, 730, 740, and 750 in response to the input of the biometric information. The plurality of electronic devices may include one or more sensors capable of recognizing biometric information about a user. The first electronic device 710 may encode the grouped biometric information, broadcast the encoded biometric information through at least one of a Simple Service Discovery Protocol (SSDP), a Multicast Domain Name System (MDNS), broadcasting, multicasting, and unicasting, and search for the plurality of electronic devices 720, 730, 740, and 750. The first electronic device 710 may connect a communication session with one or more electronic devices among the plurality of electronic devices based on a search result. Further, the first electronic device 710 may connect the communication session with the one or more electronic devices based on the biometric information from one or more electronic devices among the plurality of electronic devices. The first electronic device 710 may establish a communication session with each of the plurality of electronic devices. The plurality of electronic devices may include a mobile phone 720, a door lock 730, a TV 740, and an air conditioner 750. Further, each of the plurality of electronic devices may include a sensor which is capable of recognizing or detecting biometric information about a user. The mobile phone 720 may include a sensor which is capable of recognizing a finger print of a finger 722, the door lock 730 may include a sensor which is capable of recognizing a finger print of the finger 732, the TV 740 may include a sensor which is capable of recognizing a finger print of a finger 742, and the air conditioner 750 may include a sensor which is capable of recognizing a finger print of a finger 752. Further, the plurality of electronic devices may include various devices which are capable of establishing a communication session with the first electronic device 710, in addition to the mobile phone 720, the door lock 730, the TV 740, and the air conditioner 750.

Further, each of the plurality of electronic devices 720, 730, 740, and 750 may prepare a connection of the communication session for data transceiving with the first electronic device 710. The plurality of electronic devices 720, 730, 740, and 750 may be electronic devices which are capable of receiving one or more pieces of biometric information included in a group including the input biometric information.

The communication session may include a session for providing data transeption between the connected electronic device. Further, the first electronic device 710 may transceive data or authentication information with one or more of the plurality of electronic devices 720, 730, 740, and 750 through the communication session. Further, the first electronic device 710 may transceive data by using the communication session connected with one or more of the plurality of electronic devices 720, 730, 740, and 750 through the server (not illustrated).

Figure 8:
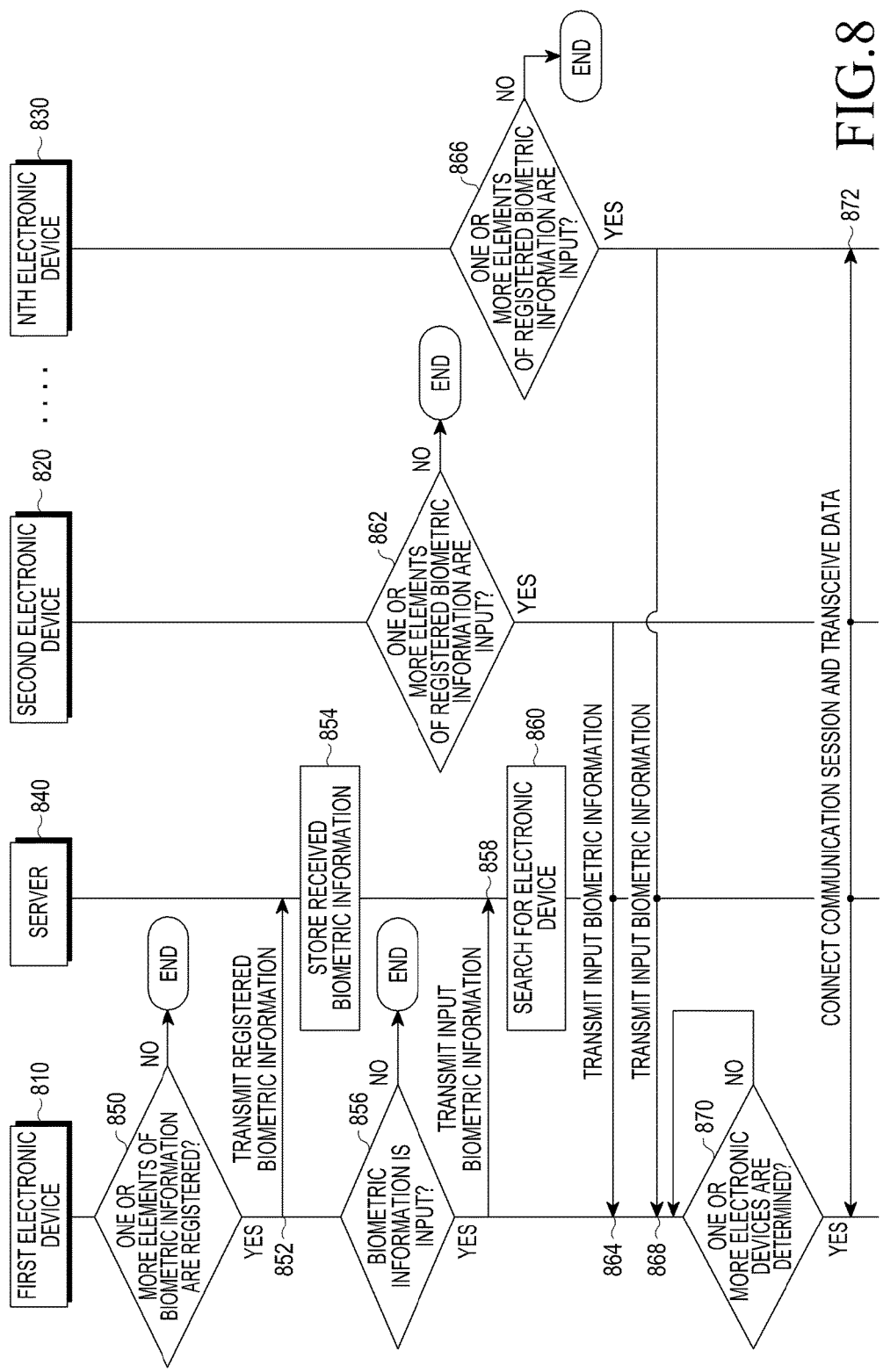
FIG. 8 is a flowchart illustrating data transception between an electronic device according to various exemplary embodiments of the present disclosure and two or more electronic devices through a server.

FIG. 8 is a flowchart illustrating data transception between an electronic device according to various exemplary embodiments of the present disclosure and two or more electronic devices, via a server.

A first electronic device 810 may register one or more pieces of biometric information (850). The first electronic device 810 may detect one or more pieces of biometric information input through one or more sensors provided in the first electronic device 810. The first electronic device 810 may group one or more pieces of input biometric information, and store or register the grouped biometric information. The first electronic device 810 also may group one or more pieces of input biometric information, and transmit the grouped biometric information to a server 840. The server 840 may store biometric information received from the first electronic device 810 (854). Further, the server 840 may store biometric information received from a second electronic device 820 and an $N^{th}$ electronic device 830. The biometric information may include intrinsic information for each user. The biometric information may include at least one of a finger print, a foot print, an iris, a face, a heart rate, brain waves, joints, and a pulse beat. The first electronic device 810 may compare the grouped biometric information and any one or more pieces of biometric information, and determine whether the grouped biometric information is the same as the one or more pieces of biometric information. The first electronic device 810 may group one or more pieces of biometric information about one or more users. The grouped biometric information may include at least one piece of biometric information about a first user and at least one piece of biometric information about a second user. The first electronic device 810 may transmit the grouped biometric information to the server 840.

When biometric information is input (856), the first electronic device 810 may transmit the input biometric information to the server 840 (858), and the server 840 may receive the biometric information (858), determine whether the biometric information input in operation 856 is included in stored biometric information, and search for at least two electronic devices 820 and 830 to which the biometric information is input (860). The first electronic device 810 may encode the grouped biometric information, and transmit the encoded biometric information to the second electronic device 820 or the $N^{th}$ electronic device 830, or the server 840 through at least one of a Simple Service Discovery Protocol (SSDP), a Multicast Domain Name System (MDNS), broadcasting, multicasting, and unicasting. When biometric information is received from the first electronic device 810 in a state where the one or more pieces of biometric information registered in operation 850 is stored (858), the server 840 may determine whether the stored biometric information is the same as the biometric information. Further, when biometric information is input in a state where the one or more pieces of biometric information registered in operation 850 are grouped and registered (or stored), the first electronic device 810 may determine whether the grouped biometric information is the same as the biometric information. When the grouped biometric information is the same as the biometric information, the first electronic device 810 may encode the grouped biometric information, and broadcast the encoded grouped biometric information to at least one of the second electronic device 820 and the $N^{th}$ electronic device 830 located in a neighboring area or transmit the encoded grouped biometric information to the server 840, and the second electronic device 820 and the N$^{th}$ electronic device 830 receiving the encoded grouped biometric information may transmit a response to the received encoded grouped biometric information to the first electronic device 810 or the server 840, so that the server 840 may search for the second electronic device 820 and the N$^{th}$ electronic device 830. Further, the server 840 may transmit a search result to the first electronic device 810. Further, the first electronic device 810 may search for the second electronic device 820 and the N$^{th}$ electronic device 830 through the server 840. Further, the first electronic device 810 may determine, or discover, one or more electronic devices based on the search result received from the server 840.

When biometric information is input to the second electronic device and/or the N$^{th}$ electronic device 830 in a state where the registered biometric information received from the first electronic device 810 is received (862 and 866), the second electronic device 820 and the N$^{th}$ electronic device 830 may encode the input biometric information and transmit the encoded biometric information to at least one of the server 840 and the first electronic device 810 (864 and 868). The second electronic device 820 may analyze the encoded biometric information received from the first electronic device 810, and determine whether the one or more pieces of biometric information input in operation 862 are included in the received biometric information. When it is determined that the biometric information registered to the first electronic device 810 is the same as the one or more biometric information input in operation 862, the second electronic device 820 may encode the one or more pieces of input biometric information and transmit the one or more pieces of encoded biometric information to the first electronic device 810. Similarly, the N$^{th}$ electronic device 830 may analyze the encoded biometric information received from the first electronic device 810, and determine whether the one or more pieces of biometric information input in operation 866 are included in the received biometric information. When it is determined that the biometric information registered to the first electronic device 810 is the same as the one or more biometric information input in operation 866, the N$^{th}$ electronic device 830 may encode the one or more pieces of input biometric information and transmit the one or more pieces of encoded biometric information to the first electronic device 810.

Further, the second electronic device 820 and the N$^{th}$ electronic device 830 may establish a connection via a communication session for transceiving data with the first electronic device 810. Further, each of the second electronic device 820 and the N$^{th}$ electronic device 830 may establish a connection via the communication session for transceiving data with each other. The second electronic device 820 and the N$^{th}$ electronic device 830 may be electronic devices receiving other biometric information of a group including the input biometric information. The first electronic device 810 may transmit a request for the second electronic device 820 and the N$^{th}$ electronic device 830 to the server 840, the server 840 may search for the second electronic device 820 and the N$^{th}$ electronic device 830 in response to the received request, and transmit a search result to the first electronic device 810, and the first electronic device 810 may analyze the search result received from the server 840 and search for or determine the second electronic device 820 and the N$^{th}$ electronic device 830.

The first electronic device 810 may determine that the second electronic device 820 and the N$^{th}$ electronic device 830 are electronic devices based on the received biometric information (870). The first electronic device 810 may recognize that the second electronic device 820 and the N$^{th}$ electronic device 830 are located in a neighboring area, and are the electronic devices for transceiving data based on the biometric information received from the server 840. Further, the first electronic device 810 may recognize that the second electronic device 820 and the N$^{th}$ electronic device 830 are located in a neighboring area, and are the electronic devices for transceiving data based on the biometric information received from the second electronic device 820 and the N$^{th}$ electronic device 830. The first electronic device 810 may encode the stored biometric information, broadcast the encoded biometric information to one or more electronic devices located in a local area in which the second electronic device 820 and the N$^{th}$ electronic device 830 are located, and determine the second electronic device 820 and the N$^{th}$ electronic device 830 or the one or more electronic devices by using a response signal received in response to the broadcasted biometric information. Further, the first electronic device 810 may transmit the stored biometric information to the server 840.

The server 840 may establish a communication session between the first electronic device 810 and the second electronic device 820, or the first electronic device 810 and the N$^{th}$ electronic device 830, or the second electronic device 820 and the N$^{th}$ electronic device 830 (872). The first electronic device 810 may connect the communication session with at least one of the determined second electronic device 820 and N$^{th}$ electronic device 830. Further, the server 840 may control the second electronic device 820 and the N$^{th}$ electronic device 830 so that the communication session is connected between the two or more determined electronic devices. The first electronic device 810 may establish the communication session with the server 840. The first electronic device 810 may establish the communication session with the second electronic device 820. The communication session may include a session for providing data transeption between the connected electronic device. The first electronic device 810 may transceive data with the electronic device through the connected communication session. The first electronic device 810 may transceive data through the communication session connected with the second electronic device 820. The first electronic device 810 may transceive data through the communication session established with the N$^{th}$ electronic device 830. The first electronic device 810 may transceive data via the communication session established with the second electronic device 820 and the N$^{th}$ electronic device 830 through the server 840.

Figure 9:
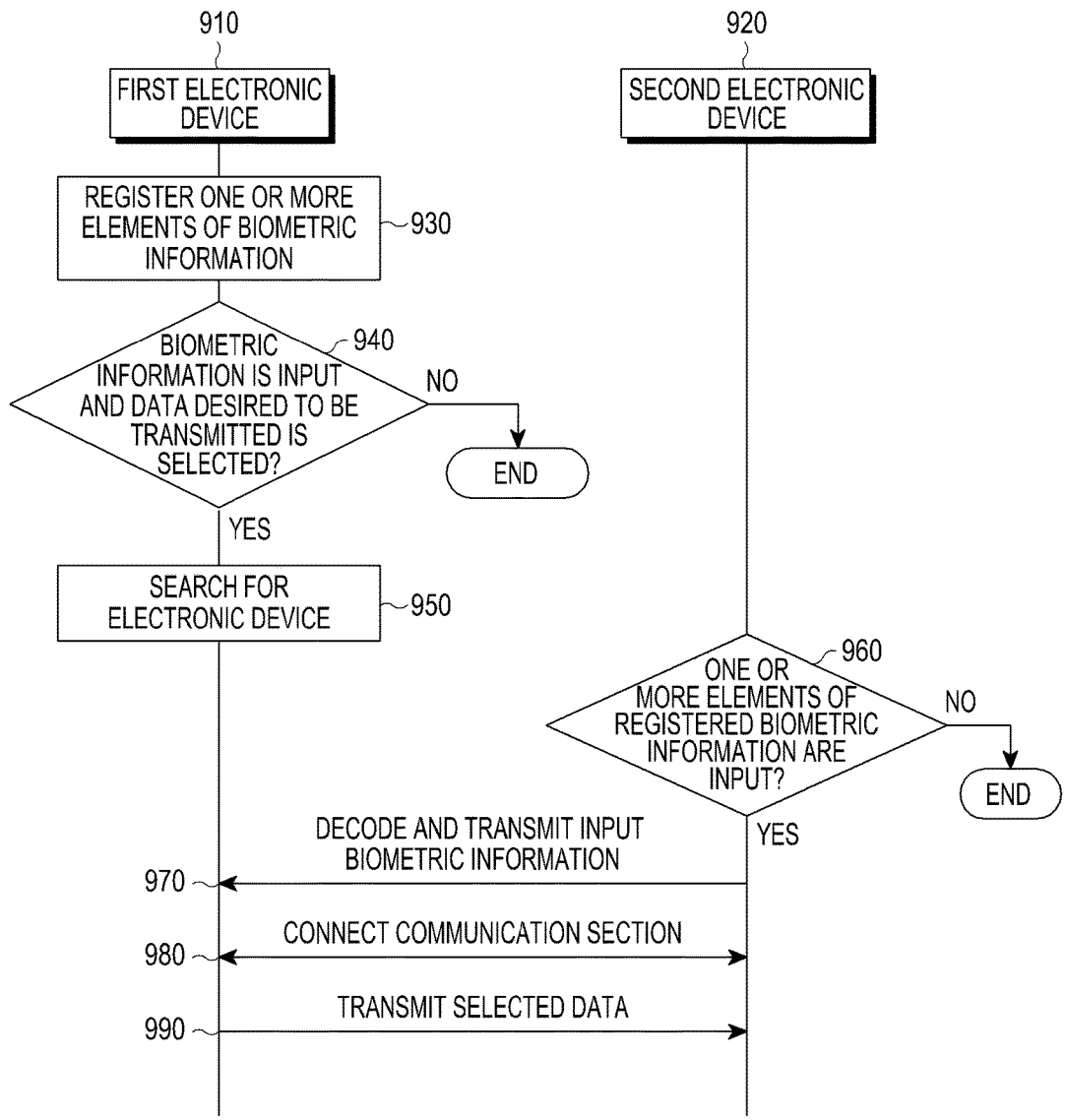
FIG. 9 is a flowchart illustrating a process of transmitting data by searching for an electronic device according to various exemplary embodiments of the present disclosure.

FIG. 9 is a flowchart illustrating a process of transmitting data by searching for an electronic device according to various exemplary embodiments of the present disclosure.

A first electronic device 910 may register one or more pieces of biometric information (930). The first electronic device 910 may detect one or more pieces of biometric information input through one or more sensors provided in the first electronic device. The first electronic device 910 may group one or more pieces of input biometric information, and store or register the grouped biometric information. The first electronic device 910 may compare the grouped biometric information and any one or more pieces of biometric information, and determine whether the grouped biometric information is the same as the one or more pieces of biometric information. The first electronic device 910 may group one or more pieces of biometric information about one or more users. The grouped biometric information may include at least one piece of biometric information about a first user and at least one piece of biometric information about a second user. The first electronic device 910 may transmit the grouped biometric information to a server or one or more other electronic devices.

When biometric information is input and data desired to be transmitted is selected based on the input biometric information (940), the first electronic device 910 may determine whether the input biometric information is included in the biometric information registered in operation 930, and search for a second electronic device 920 to which the biometric information is input (950). The first electronic device 910 may encode the grouped biometric information, broadcast the encoded biometric information through at least one of a Simple Service Discovery Protocol (SSDP), a Multicast Domain Name System (MDNS), broadcasting, multicasting, and unicasting, and search for the second electronic device 920 or one or more electronic devices. When biometric information is input in a state where the one or more pieces of biometric information is registered in operation 930, the first electronic device 910 may determine whether the stored biometric information is the same as the biometric information. When biometric information is input in a state where the one or more pieces of biometric information is grouped and registered (or stored) in operation 930, the first electronic device 910 may determine whether the grouped biometric information is the same as the biometric information. When the grouped biometric information is the same as the biometric information, the first electronic device 910 may encode the grouped biometric information and broadcast the encoded grouped biometric information, and the second electronic device 920 receiving the broadcasted encoded biometric information may encode the received biometric information and broadcast the encoded biometric information. Further, the first electronic device 910 may decode the encoded biometric information broadcasted from the second electronic device 920, compare the decoded biometric information with the grouped biometric information, and search for the second electronic device 920.

When biometric information is input in a state where the encoded biometric information received from the first electronic device 910 is received (960), the second electronic device 920 may encode the input biometric information and transmit the encoded biometric information to the first electronic device 910 (970). The second electronic device 920 may decode and analyze the encoded biometric information received from the first electronic device 910, and determine whether the one or more pieces of biometric information input in operation 960 are included in the biometric information received from the first electronic device. When it is determined that the biometric information registered to the first electronic device 910 is the same as the one or more biometric information input in operation 960, the second electronic device 920 may encode the one or more pieces of input biometric information and transmit the one or more pieces of encoded biometric information to the first electronic device 910. Further, the second electronic device 920 may prepare a connection of a communication session for transceiving data with the first electronic device 910. The second electronic device 920 may be an electronic device receiving other biometric information of a group including the input biometric information.

The first electronic device 910 may establish the communication session with the second electronic device 920 (980). Further, when the number of determined second electronic devices is two or more, the first electronic device 910 may control the two electronic devices so that the communication session is established between the two or more determined electronic devices. The first electronic device 910 may establish a communication session with the server. The communication session may include a session for providing data transeption between the connected electronic device.

The first electronic device 910 may transmit the data selected in operation 940 to the second electronic device 920 through the connected communication session (990). The first electronic device 910 may transmit the data to the second electronic device 920 via the server through the communication session connected with the second electronic device 920 through the server. The first electronic device 910 may transmit the data through the communication session connected with one or more electronic devices via a server.

Figure 10A:
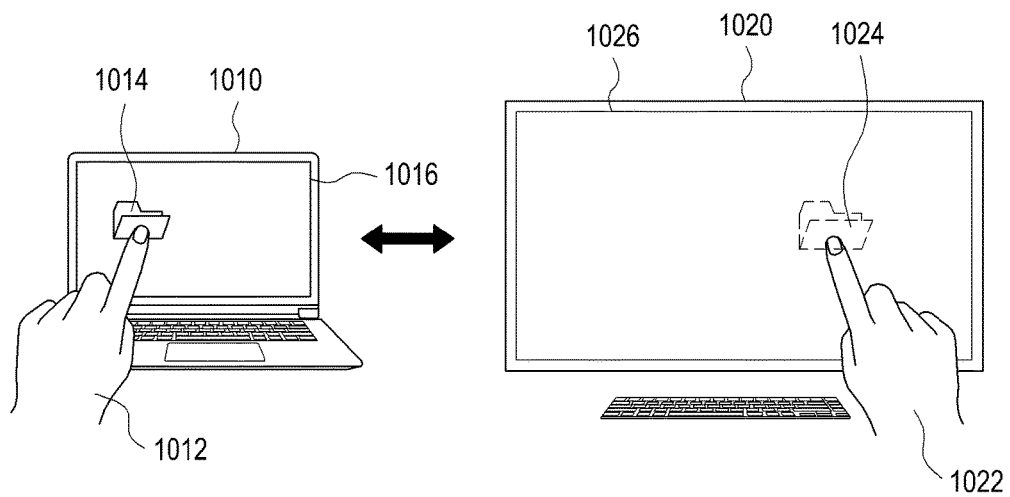
FIG. 10A is a diagram illustrating an example in which selected data is transmitted according to an exemplary embodiment of the present disclosure.
Figure 10B:
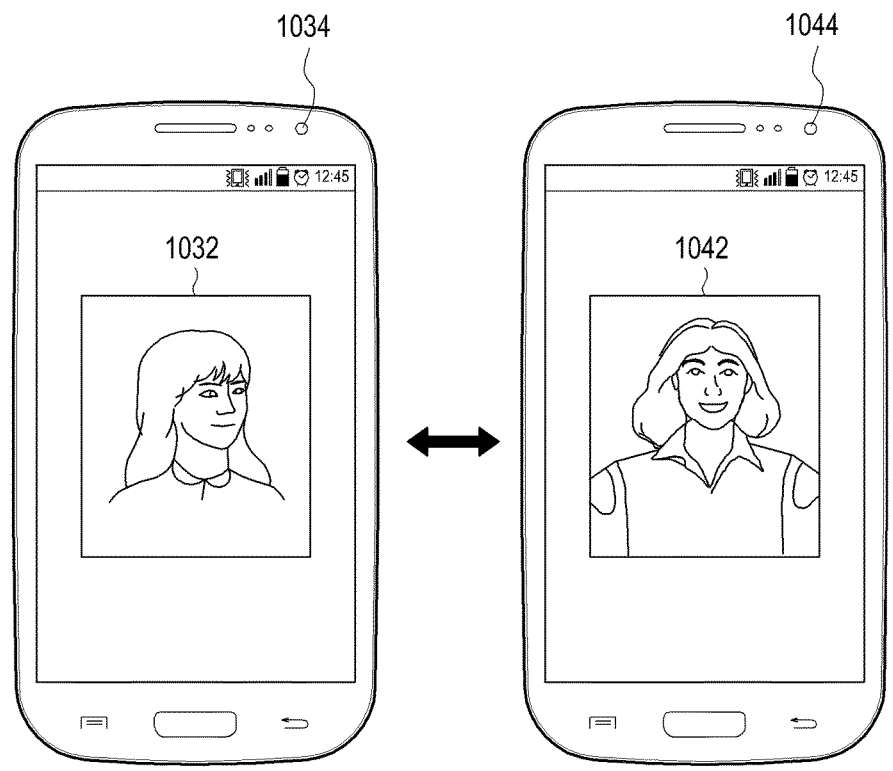
FIG. 10B is a diagram illustrating an example in which data is transmitted by using biometric information according to an exemplary embodiment of the present disclosure.

FIG. 10A is a diagram illustrating an example in which selected data is transmitted according to an exemplary embodiment of the present disclosure, and FIG. 10B is a diagram illustrating an example in which data is transmitted by using biometric information according to an exemplary embodiment of the present disclosure.

Referring to FIG. 10A, one or more pieces of biometric information are registered to a first electronic device 1010. The first electronic device 1010 may group one or more pieces of input biometric information, and store or register the grouped biometric information. The first electronic device 1010 may compare the grouped biometric information and any one or more pieces of biometric information, and determine whether the grouped biometric information is the same as the one or more pieces of biometric information. The first electronic device 1010 may group one or more pieces of biometric information about one or more users. The grouped biometric information may include at least one piece of biometric information about a first user and at least one piece of biometric information about a second user. Further, a display 1016 of the first electronic device 1010 may recognize the biometric information. The display 1016 may display one or more pieces of data 1016. When a user desires to transmit data to a second electronic device 1020, the user may input biometric information (for example, a finger print) by touching the display 1016 by using a finger 1012, and select data 1014 desired to be transmitted to the second electronic device 1020. When the touch of the finger 1012 of the user is detected, the first electronic device 1010 may analyze the biometric information about the detected finger of the user. Further, the first electronic device 1010 may recognize the data 1014 touched by the finger 1012.

Further, the first electronic device 1010 may determine whether the recognized biometric information is stored in stored biometric information. Further, the first electronic device 1010 may search for a second electronic device 1012 to which one or more pieces of other biometric information included in a group of the biometric information. For example, as illustrated in FIG. 10A, when a finger of a left hand is input in a state where grouped biometric information stored in the first electronic device 1010 includes biometric information about a finger of a left hand 1012 and biometric information about a finger of a right hand 1022, the first electronic device 1010 may search for one or more electronic devices to which the grouped biometric information including the finger of the right hand is input. For example, if the biometric information about the finger of the right hand 1022 is input, the first electronic device 1010 may establish the communication session for transceiving data with the second electronic device 1020. Further, the first electronic device 1010 may transmit the selected data 1014 to the second electronic device 1020, and the second electronic device 1020 may display data 1024 received from the first electronic device 1010 at a touch point of the finger of the right hand 1022.

The first electronic device 1010 may group a plurality of pieces of input biometric information, and when one or more pieces of biometric information among the grouped biometric information is input, the first electronic device 1010 may search for the second electronic device 1020 to which the one or more pieces of biometric information among the grouped biometric information is input. Further, the first electronic device 1010 may transmit the selected data to the second electronic device 1020. The input of the biometric information and the selection of the data may be simultaneously performed, and further, the data transmission may also be performed at the same time.

Referring to FIG. 10B, one or more pieces of biometric information are registered to a first electronic device 1030. The biometric information may include biometric information about a face, as well as biometric information about a finger print. A user may photograph a face by using a camera 1034, and store the photographed face as biometric information. Further, the first electronic device 1030 may group one or more pieces of input biometric information about the face, and store or register the grouped biometric information. The first electronic device 1030 may compare the grouped biometric information and any one or more pieces of biometric information, and determine whether the grouped biometric information is the same as the one or more pieces of biometric information. Further, the camera 1034 provided in the first electronic device 1030 may photograph and recognize biometric information (for example, a face). Further, the camera 1034 may display the recognized face 1032 on a display. When the user desires to transmit data to a second electronic device 1040, and the user makes his/her face be close to the camera 1034, the first electronic device 1030 may recognize the face by using the camera 1034 and analyze the recognized face. Further, the first electronic device 1030 may search whether the face is recognized through a camera 1044 of the second electronic device 1040. The first electronic device 1030 may search for the second electronic device 1040 which recognizes one or more pieces of biometric information included in the grouped biometric information. The biometric information about the face recognized through the camera 1034 of the first electronic device 1030 and the biometric information about the face recognized through the camera 1044 of the second electronic device 1040 may be pre-stored in the first electronic device 1030.

Further, when the data which the user desires to transmit is selected, the first electronic device 1030 may search for the second electronic device 1040, which recognizes other biometric information in the group including the biometric information related to the face recognized through the camera 1034 to transmit the selected data to the searched second electronic device 1040.

As illustrated in FIG. 10B, when a first face is recognized in a state where the grouped biometric information stored in the first electronic device 1030 includes biometric information about a first face 1032 and biometric information about a second face 1042, the first electronic device 1030 may search for the second electronic device 1040 into which the grouped biometric information including the first face is input. For example, when the biometric information about the first face 1032 is input, the first electronic device 1030 may establish the communication session for transceiving data with the second electronic device 1040. Further, the first electronic device 1030 may transmit the data selected by the user to the second electronic device 1040.

Figure 11:
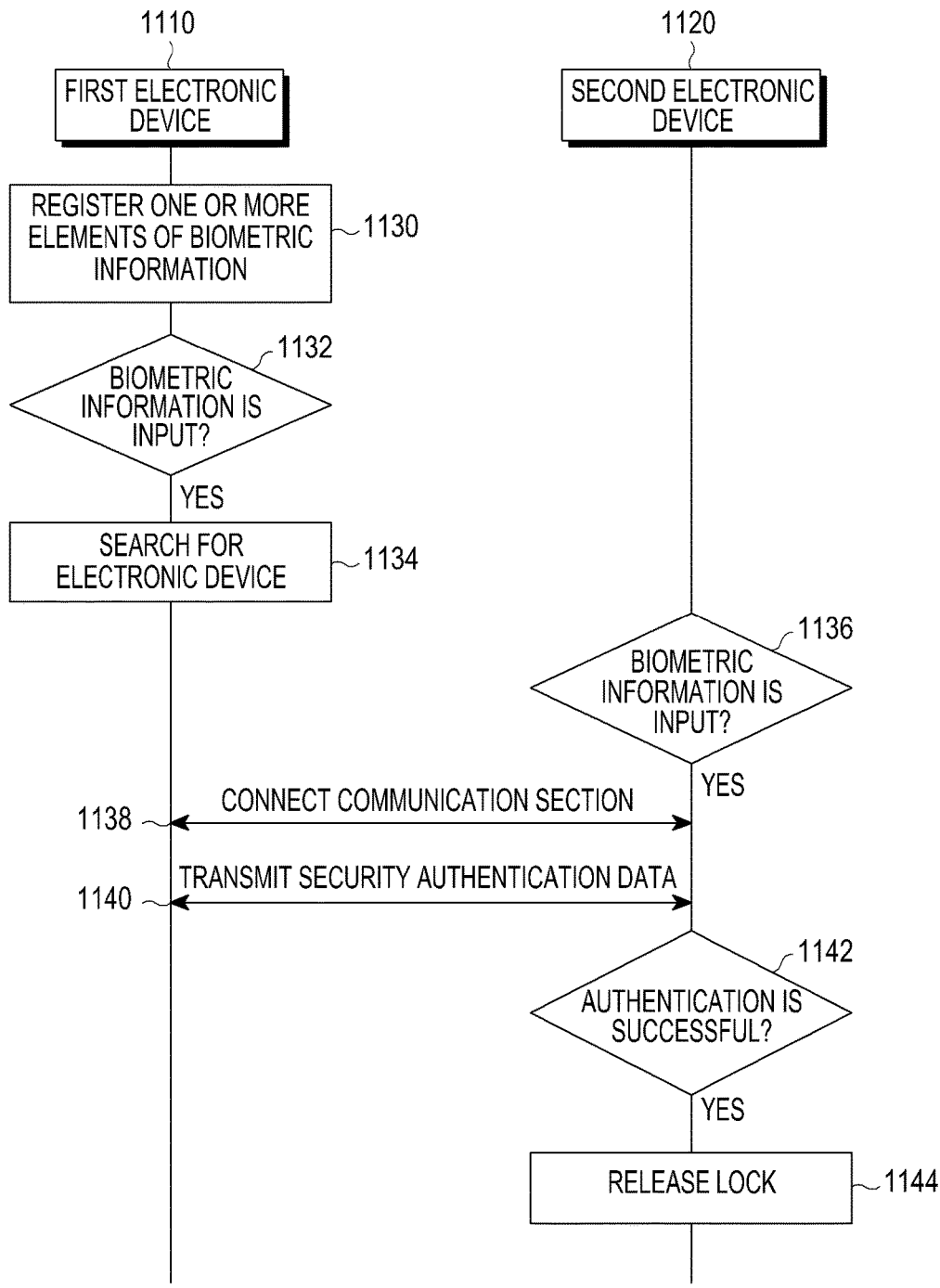
FIG. 11 is a flowchart illustrating a process of releasing a door lock by using biometric information according to an exemplary embodiment of the present disclosure.

FIG. 11 is a flowchart illustrating a process of releasing a door lock by using biometric information according to an exemplary embodiment of the present disclosure.

Hereinafter, a process of releasing a door lock by using biometric information according to an exemplary embodiment of the present disclosure will be described in detail with reference to FIG. 11 below.

A first electronic device 1110 may register one or more pieces of biometric information (1130). The first electronic device 1110 may detect one or more pieces of biometric information input through one or more sensors provided in the first electronic device 1110. The first electronic device 1110 may group one or more pieces of input biometric information, and store or register the grouped biometric information. The biometric information may include intrinsic information for each user. The biometric information may include at least one of a finger print, a foot print, an iris, a face, a heart rate, brain waves, joints, and a pulse beat. The first electronic device 1110 may compare the grouped biometric information and any one or more pieces of biometric information that is received at or input to the first electronic device, and determine whether the grouped biometric information is the same as the one or more pieces of biometric information. The first electronic device 1110 may group one or more pieces of biometric information about one or more users. The grouped biometric information may include at least one piece of biometric information about a first user and at least one piece of biometric information about a second user. The first electronic device 1110 may transmit the grouped biometric information to a second electronic device 1120. The first electronic device 1110 may search for the second electronic device 1120 into which the one or more pieces of biometric information among the grouped biometric information are input. Further, the second electronic device 1120 may transmit the input biometric information to the first electronic device 1110. The second electronic device 1120 may be a door lock. The second electronic device 1120 may receive the biometric information from the first electronic device 1110, and release the lock of a door or set a lock.

When biometric information is input (1132), the first electronic device 1110 may determine whether the input biometric information is included in the biometric information registered in operation 1130. Further, the first electronic device 1110 may search for the second electronic device 1120 into which biometric information among the registered biometric information are input (1134). The first electronic device 1110 may encode the grouped biometric information, broadcast the encoded biometric information through at least one of a Simple Service Discovery Protocol (SSDP), a Multicast Domain Name System (MDNS), broadcasting, multicasting, and unicasting, and search for the second electronic device 1120. When the biometric information is input in a state where the one or more pieces of biometric information are registered in operation 1130, the first electronic device 1110 may determine whether the stored biometric information is the same as the biometric information. When the stored biometric information is the same as the biometric information, the first electronic device 1110 may encode the grouped biometric information and transmit the encoded grouped biometric information to at least one of the second electronic device 1120 and a server (not illustrated).

When the biometric information is input into the second electronic device 1120 (1136), a communication session may be established between the first electronic device 1110 and the second electronic device 1120 (1138). When the biometric information is input, the second electronic device 1120 encodes the input biometric information, and transmits the encoded biometric information to the first electronic device 1110 through the established communication session. Further, the first electronic device 1110 may decode the encoded biometric information, and determine whether the biometric information received from the second electronic device 1120 corresponds to any one of grouped biometric information pre-stored in the first electronic device 1110.

Further, when the biometric information received from the second electronic device 1120 is the same as any one of the grouped biometric information pre-stored in the first electronic device 1110, the first electronic device 1110 may transmit security authentication information to the second electronic device 1120 (1140). When the second electronic device 1120 receives the security authentication information from the first electronic device 1110, the second electronic device 1120 analyzes the received security authentication information, determines whether the biometric information input in operation 1136 is authentication-completed biometric information, and releases a lock (1142 and 1144). FIG. 11 illustrates that the security authentication data is transceived by directly establishing the communication session between the first electronic device 1110 and the second electronic device 1120, but this is only an example, and in the present disclosure, a server (not illustrated) for providing a communication session, transceiving biometric information, and transceiving the security authentication data between the first electronic device 1110 and the second electronic device 1120 may be configured as an intermediate node.

Figure 12:
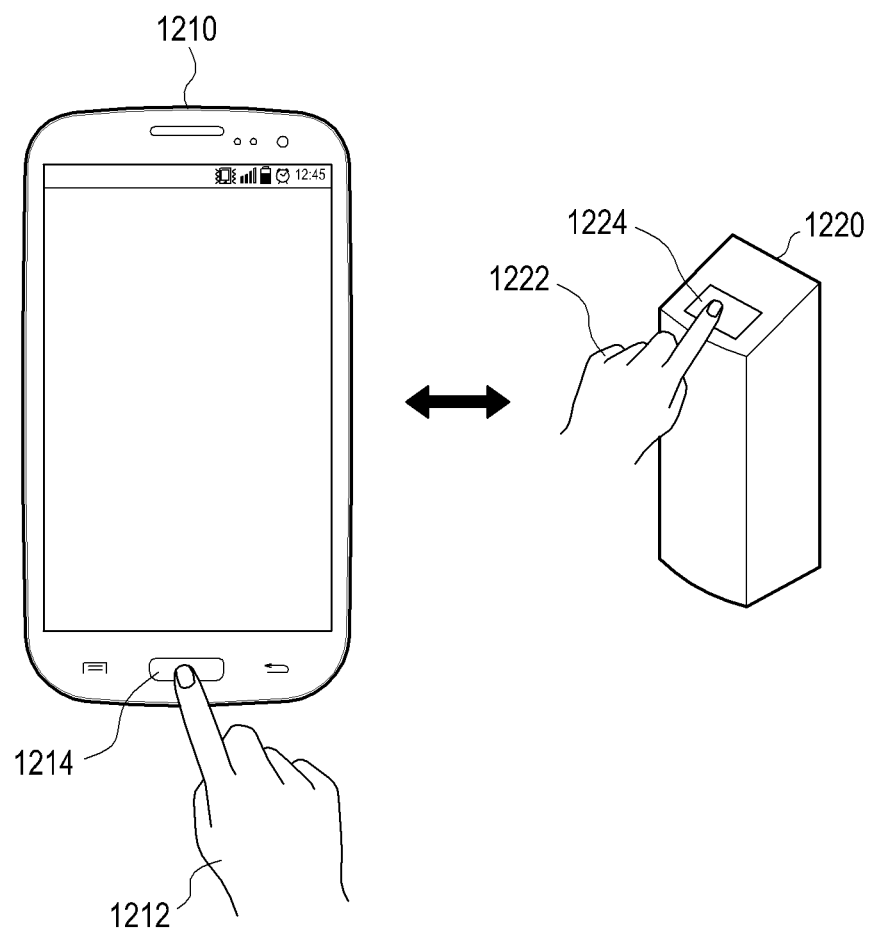
FIG. 12 is a diagram illustrating an example in which a door lock is released by using biometric information according to an exemplary embodiment of the present disclosure.

FIG. 12 is a diagram illustrating an example in which a door lock is released by using biometric information according to an exemplary embodiment of the present disclosure.

Referring to FIG. 12, one or more pieces of biometric information are registered to a first electronic device 1210. The first electronic device 1210 may group one or more pieces of input biometric information, and store or register the grouped biometric information. The first electronic device 1210 may recognize a finger print through a finger print recognizing sensor 1214, and store and/or transmit a finger print input based on a finger 1212. The first electronic device 1210 may group biometric information input through a camera, various sensors, a finger print recognizing sensor, and the like. The grouped biometric information may include biometric information about the same user or various users. When the biometric information is input, the first electronic device 1210 may search for a second electronic device 1220.

When the second electronic device 1220 is a door lock, a user may release or set a lock of the second electronic device 1220. In order to allow the user to release or set the lock of the second electronic device 1220, the user may touch a finger print recognizing sensor 1224 of the second electronic device 1220 with a finger 1222 and input biometric information (for example, a finger print). When the touch of the finger 1222 of the user is detected, the second electronic device 1220 may analyze the biometric information of the detected finger of the user. A communication session may be connected between the first electronic device 1210 and the second electronic device 1220. The communication session may be established by the first electronic device 1210 or the second electronic device 1220. When the communication session is connected, the second electronic device 1220 may transmit the input biometric information to the first electronic device 1210, and the first electronic device 1210 may determine whether the received biometric information is the same as biometric information among biometric information pre-stored in the first electronic device 1210. When the same biometric information exists, the first electronic device 1210 may determine whether the finger print input into the finger print recognizing sensor 1224 of the second electronic device 1220 is a finger print of the user on which the authentication is performed, and may transmit security authentication data to the second electronic device 1220. Further, the second electronic device 1220 may receive the security authentication data and release or set the lock.

Figure 13:
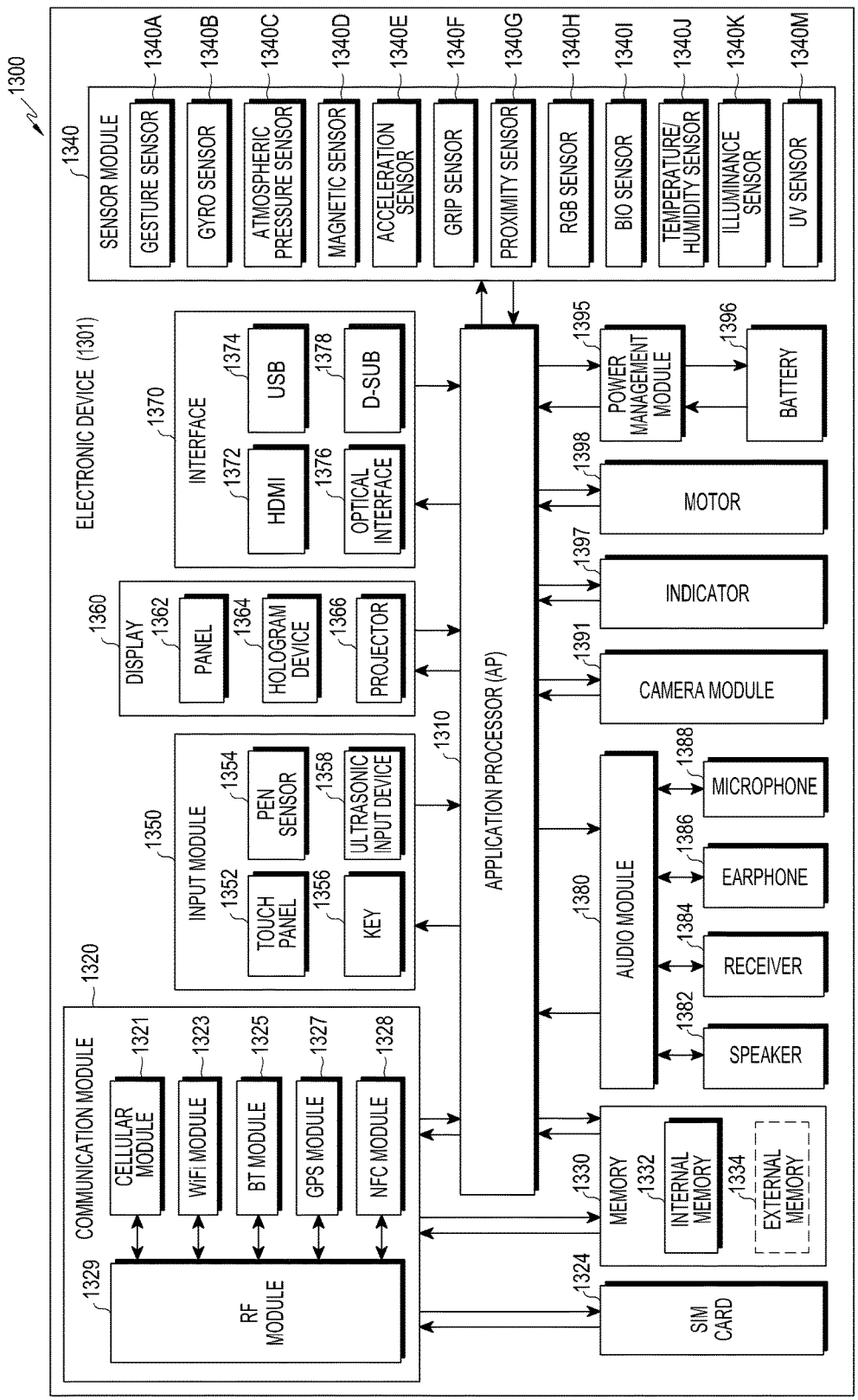
FIG. 13 is a block diagram illustrating an electronic device according to various exemplary embodiments of the present disclosure.

FIG. 13 is a block diagram illustrating an electronic device according to various exemplary embodiments of the present disclosure.

For example, the electronic device may comprise all or part of the electronic device 101 as illustrated in FIG. 1. Referring to FIG. 13, an electronic device 1301 may include one or more Application Processors (AP) 1310, a communication unit 1320, a Subscriber Identification Module (SIM) card 1324, a memory 1330, a sensor unit 1340, an input device 1350, a display 1360, an interface 1370, an audio unit 1380, a camera unit 1391, a power management unit 1395, a battery 1396, an indicator 1397, and a motor 1398.

The AP 1310 may control a plurality of hardware or software components connected to the AP 1310 by driving an operating system or an application program, and process and calculate various data including multimedia data. The AP 1310 may be implemented by, for example, a System on Chip (SoC). According to an exemplary embodiment, the AP 1310 may further include a Graphic Processing Unit (GPU).

The communication unit 1320 (for example, the communication interface 160 of FIG. 1) may perform data transmission/reception between the electronic device 1301 (for example, the electronic device 101) and other electronic devices (for example, the electronic device 104 and the server 106) connected over a network. According to one exemplary embodiment, the communication unit 1320 may include a cellular module 1321, a WiFi module 1323, a BT module 1325, a GPS module 1327, an NFC module 1328, and a Radio Frequency (RF) module 1329.

The cellular module 1321 may provide a voice call, a video call, an SMS service, an Internet service, and the like through a communication network (for example, LTE, LTE-A, CDMA, WCDMA, UMTS, WiBro, or GSM). Also, the cellular module 1321 may identify and authenticate an electronic device in a communication network by using, for example, a subscriber identification module (for example, the SIM card 1324). According to an exemplary embodiment, the cellular module 1321 may perform at least some of the functions which may be provided by the AP 1310. For example, the cellular module 1321 may perform at least a part of the multimedia control function.

According to an exemplary embodiment, the cellular module 1321 may include a Communication Processor (CP). Furthermore, the cellular module 1321 may be embodied as an SoC, for example. FIG. 13 illustrates the components, such as the cellular module 1321 (for example, the communication processor), the memory 1330, or the power management unit 1395, are separated from the AP 1310, but according to an exemplary embodiment, the AP 1310 may include at least some (for example, the cellular module 1321) of the aforementioned components.

According to an exemplary embodiment of the present disclosure, the AP 1310 or the cellular module 1321 (for example, the communication processor) may load, to a volatile memory, commands or data received from at least one of a non-volatile memory and other component elements connected thereto, and may process the loaded commands or data. Furthermore, the AP 1310 or the cellular module 1321 may store data received from or generated by at least one of the other components in a non-volatile memory.

Each of the WiFi module 1323, the BT module 1325, the GPS module 1327, and the NFC module 1328 may include, for example, a processor for processing data transmitted/received through a corresponding module. Although the cellular module 1321, the WiFi module 1323, the BT module 1325, the GPS module 1327, and the NFC module 1328 are illustrated as individual blocks in FIG. 13, at least some (for example, two or more) of the cellular module 1321, the WiFi module 1323, the BT module 1325, the GPS module 1327, and the NFC module 1328 may be included within one Integrated Chip (IC) or one IC package. For example, at least some of the processors corresponding to the cellular module 1321, the WiFi module 1323, the BT module 1325, the GPS module 1327, and the NFC module 1328 respectively (for example, a CP corresponding to the cellular module 1321 and a WiFi processor corresponding to the WiFi module 1323) may be implemented as one SoC.

The RF module 1329 may transmit/receive data, for example, an RF signal. Although not illustrated, the RF module 1329 may include, for example, a transceiver, a Power Amp Module (PAM), a frequency filter, a Low Noise Amplifier (LNA), or the like. Further, the RF unit 1329 may further include a component for transmitting/receiving an electromagnetic wave in the air in radio communication, such as a conductor or a conducting wire. Although the cellular module 1321, the WiFi module 1323, the BT module 1325, the GPS module 1327, and the NFC module 1328 are illustrated to share one RF module 1329 in FIG. 13, at least one of the cellular module 1329, the WiFi module 1321, the BT module 1323, the GPS module 1325, and the NFC module 1327 may transmit/receive the RF signal through a separate RF module.

The SIM card 1324 may be a card including a subscriber identification module, and may be inserted into a slot formed in a particular portion of an electronic device. The SIM card 1324 may include unique identification information (for example, an Integrated Circuit Card IDentifier (ICCID)) or subscriber information (for example, an International Mobile Subscriber IDentity (IMSI)).

The memory 1330 (for example, the memory 130) may include an embedded memory 1332 or an external memory 1334. The embedded memory 1332 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an exemplary embodiment, the internal memory 1332 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 934 may be functionally connected to the electronic device 1301 through various interfaces. According to an exemplary embodiment, the electronic device 1301 may further include a storage device (or storage medium) such as a hard drive.

The sensor unit 1340 may measure a physical quantity or detect an operation state of the electronic device 1301, and convert the measured or detected information into an electronic signal. The sensor unit 1340 may include, for example, at least one of a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (for example, red, green, and blue (RGB) sensor), a biometric sensor 1340I, a temperature/humidity sensor 1340J, an illumination sensor 1340K, and an Ultra Violet (UV) sensor 1340M. Additionally or alternatively, the sensor unit 1340 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor (not illustrated), and the like. The sensor unit may include at least one sensor capable of detecting or recognizing biometric information, such as a finger print, a foot print, an iris, a face, a heart rate, brain waves, joints, and a pulse beat. Further, the sensor unit 1340 may include various sensors which are capable of detecting or recognizing biometric information about a user or information about a bent of a joint of a user, in addition to the plurality of aforementioned sensors. The sensor unit 1340 may further include a control circuit for controlling one or more sensors included therein.

The input device 1350 may include a touch panel 1352, a (digital) pen sensor 1354, a key 956, or an ultrasonic input device 1358. The touch panel 1352 may recognize a touch input in at least one type among, for example, a capacitive type, a resistive type, an infrared type, and an acoustic wave type. Further, the touch panel 1352 may further include a control circuit. The capacitive scheme touch panel may recognize physical contact or proximity. The touch panel 1352 may further include a tactile layer. In this case, the touch panel 1352 may provide a tactile reaction to a user.

The (digital) pen sensor 1354 may be embodied, for example, using a method identical or similar to a method of receiving a touch input of a user, or using a separate recognition sheet. The key 1356 may include, for example, a physical button, an optical key or a keypad. The ultrasonic input device 1358 is a device which is capable of identifying data by generating an ultrasonic signal through an input tool and detecting a sonic wave through a microphone (for example, the microphone 1388) in the electronic device 1301, and is capable of wireless recognition. According to an exemplary embodiment, the electronic device 1301 may also receive a user input from an external device (for example, a computer or server) connected thereto, by using the communication unit 1320.

The display 1360 (for example, the display 150) may include a panel 1362, a hologram device 1364, or a projector 1366. The panel 1362 may be, for example, a Liquid Crystal Display (LCD) or an Active Matrix Organic Light Emitting Diode (AM-OLED). The panel 1362 may be embodied to be, for example, flexible, transparent, or wearable. The panel 1362 may be also configured as a single module with the touch panel 1352. The hologram device 1364 may show a stereoscopic image in the air by using interference of light. The projector 1366 may project light onto a screen to display an image. For example, the screen may be located inside or outside the electronic device 1301. According to an exemplary embodiment, the display 1360 may further include a control circuit for controlling the panel 1362, the hologram device 1364, or the projector 1366.

The interface 1370 may include, for example, a High-Definition Multimedia Interface (HDMI) 1372, a Universal Serial Bus (USB) 1374, an optical interface 1376, or a D-subminiature (D-sub) 1378. The interface 1370 may be included in, for example, the communication interface 160 illustrated in FIG. 1. Additionally or alternatively, the interface 1370 may include, for example, a Mobile High-definition Link (MHL) interface, a Secure Digital (SD) card/Multi-Media Card (MMC) interface, or an Infrared Data Association (IrDA) standard interface.

The audio unit 1380 may convert a sound and an electronic signal. At least some components of the audio unit 1380 may be included in, for example, the input/output interface 140 illustrated in FIG. 1. The audio unit 1380 may process voice information input or output through, for example, the speaker 1382, the receiver 1384, the earphones 1386, or the microphone 1388.

The camera 1391 is a device for photographing a still image or a video, and according to an exemplary embodiment, may include one or more image sensors (for example, a front sensor or a rear sensor), a lens (not illustrated), an Image Signal Processor (ISP) (not illustrated), or a flash (not illustrated) (for example, an LED or xenon lamp).

The power management unit 1395 may manage power of the electronic device 1301. Although not illustrated, the power management unit 1395 may include, for example, a Power Management Integrated Circuit (PMIC), a charger Integrated Circuit (IC), or a battery or fuel gauge.

The PMIC may be mounted to, for example, an integrated circuit or an SoC semiconductor. The charging methods may be divided into a wired type and a wireless type. The charger IC may charge a battery, and may prevent introduction of over-voltage or over-current from a charger. According to an exemplary embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery fuel gauge may measure, for example, the remaining amount of battery or a voltage, current, or temperature during charging. The battery 1396 may store or generate electricity, and may supply power to the electronic device 1301 using the stored or generated electricity. The battery 1396 may include, for example, a rechargeable battery or a solar battery.

The indicator 1397 may display a specific state of the electronic device 1301 or a part thereof (for example, the AP 1310), for example, a boot-up state, a message state, and a charging state. The motor 1398 may convert an electrical signal to a mechanical vibration. Although not illustrated, the electronic device 1301 may include a processing unit (for example, a GPU) for supporting a mobile TV. The processing unit for supporting the mobile TV may process media data according to a standard of Digital Multimedia Broadcasting (DMB), Digital Video Broadcasting (DVB), a media flow, or the like.

Each of the components of the electronic device according to the present disclosure may be implemented by one or more components and the name of the corresponding component may vary depending on the type of the electronic device. The electronic device according to the present disclosure may be configured by including at least one of the above-described elements (and some of the elements may be omitted), or other elements may be added. Further, some of the elements of the electronic device according to the present disclosure may be combined to be one entity, which can perform the same functions as those of the components before the combination.

Figure 14:
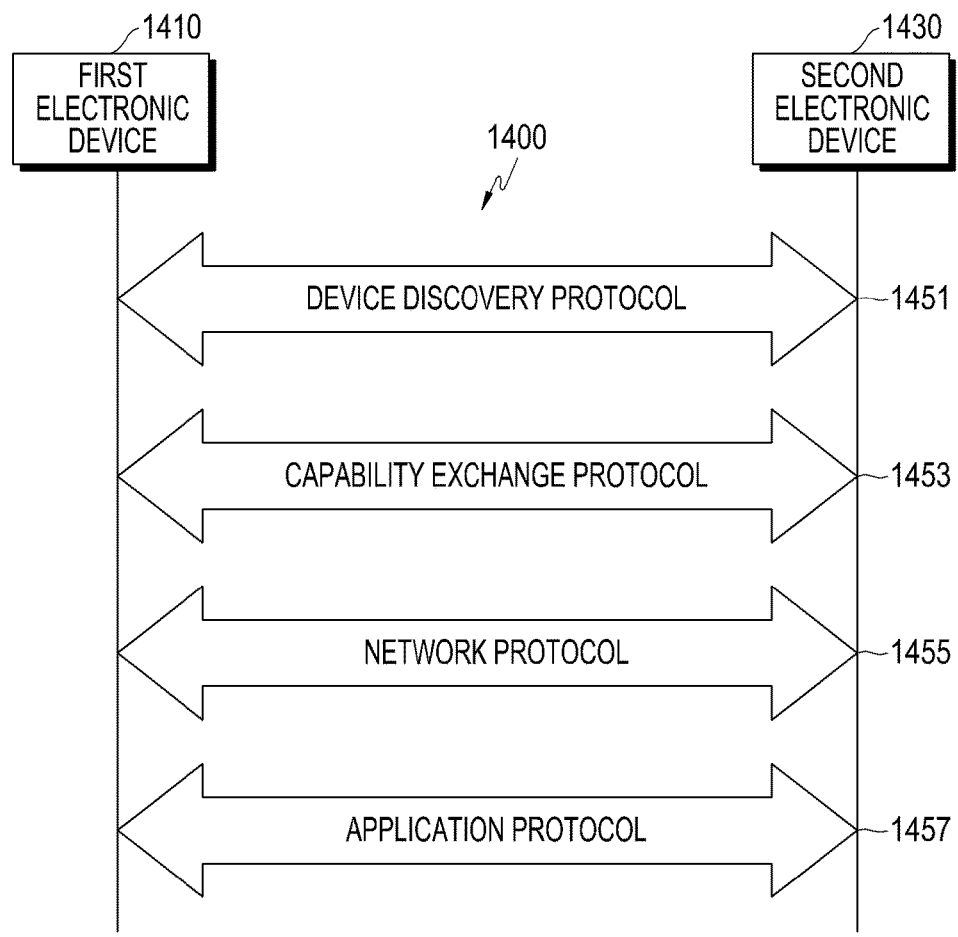
FIG. 14 illustrates a communication protocol 1400 between a plurality of electronic devices (for example, a first electronic device 1410 and a second electronic device 1430) according to various exemplary embodiments of the present disclosure.

FIG. 14 illustrates a communication protocol 1400 between a plurality of electronic devices (for example, a first electronic device 1410 and a second electronic device 1430) according to various exemplary embodiments of the present disclosure.

Referring to FIG. 14, for example, the communication protocol 1400 may include a device discovery protocol 1451, a capability exchange protocol 1453, a network protocol 1455, an application protocol 1457, and the like.

According to an exemplary embodiment, the device discovery protocol 1451 may be a protocol for detecting an external electronic device communicable with the electronic devices (for example, the first electronic device 1410 or the second electronic device 1430) by the first electronic device 1410 and the second electronic device 1430, or connecting the first electronic device 1410 or the second electronic device 1430 with the detected external electronic device. For example, the first electronic device 1410 (for example, the electronic device 101 of FIG. 1) may detect the second electronic device 1430 (for example, the electronic device 104 of FIG. 1) through a communication method (for example, WiFi, BT, or USB) usable by the first electronic device 1410 by using the device discovery protocol 1451. The first electronic device 1410 may obtain and store identification information about the detected second electronic device 1430 by using the device discovery protocol 1451 for a connection with the second electronic device 1430. The first electronic device 1410 may establish a communication connection with the second electronic device 1430 based on the identification information.

According to an exemplary embodiment, the device discovery protocol 1451 may be a protocol for a mutual authentication between a plurality of electronic devices. For example, the first electronic device 1410 may perform authentication between the first electronic device 1410 and the second electronic device 1430 based on communication information (for example, a Media Access Control (MAC) address, a Universally Unique Identifier (UUID), Subsystem Identification (SSID), and an Internet Protocol (IP) address) for the connection with one or more second electronic devices 1430.

According to one exemplary embodiment, the function exchange protocol 1453 may be a protocol for exchanging information related to a function of a service supportable by at least one of the first electronic device 1410 and the second electronic device 1430. For example, the first electronic device 1410 and the second electronic device 1430 may exchange information related to the functions of services currently provided by the first electronic device 1410 and the second electronic device 1430 through the capability exchange protocol 1453. The exchangeable information may include identification information indicating a specific service among a plurality of services supportable by the first electronic device 1410 and the second electronic device 1430. For example, the first electronic device 1410 may receive the identification information about the specific service provided by the second electronic device 1430 from the second electronic device 1430 through the capability exchangeable protocol 1453. In this case, the electronic device 1410 may determine whether the particular service can be supported by the electronic device 1410 itself based on the received identification information.

According to one exemplary embodiment, the network protocol 1455 may be, for example, a protocol for controlling a flow of data transceived to provide a service while being linked with the service between the communicably connected electronic devices (for example, the first electronic device 1410 and the second electronic device 1430). For example, at least one of the first electronic device 1410 and the second electronic device 1430 may perform error control, data quality control, or the like by using the network protocol 1455. Additionally or alternatively, the network protocol 1455 may determine a transmission format of data transceived between the first electronic device 1410 and the second electronic device 1430. Further, at least one of the first electronic device 1410 and the second electronic device 1430 may manage a session (or example, connect a session or terminate a session) for exchanging data between the first electronic device 1410 and the second electronic device 1430 by using the network protocol 1455.

According to an exemplary embodiment, the application protocol 1457 may be a protocol for providing a process or information for exchanging data related to a service provided to an external electronic device. For example, the first electronic device 1410 (for example, the electronic device 101) may provide a service to the second electronic device 1430 (for example, the electronic device 104 or the server 106) through the application protocol 1457.

According to an exemplary embodiment, the communication protocol 1400 may include a standard communication protocol, a communication protocol designated by an individual or organization (for example, a communication protocol self-designated by a communication device manufacturing company or a network supplying company) or a combination thereof.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the instruction is performed by at least one processor (for example, the processor 120 of FIG. 1), the at least one processor may perform a function corresponding to the instruction. The computer-readable storage medium may be, for example, the storing 130. At least some of the programming modules may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or programming module according to an exemplary embodiment of the present disclosure may include one or more of the above-described elements. Alternatively, some of the above-described elements may be omitted from the programming module. Alternatively, the programming module may further include additional elements. Operations executed by a module, a programming module, or other component elements according to the present disclosure may be executed sequentially, in parallel, repeatedly, or in a heuristic manner. Further, some operations may be executed according to another order or may be omitted, or other operations may be added.

According to various exemplary embodiments, in a storage medium storing commands, the commands are set so that one or more operations are performed by one or more processors when the commands are executed by the one or more processors, and the one or more operations include: an operation of storing one or more pieces of input biometric information; an operation of searching for one or more electronic devices in response to an input of the same biometric information as the stored biometric information, establishing a communication session with the one or more searched electronic devices; and an operation of transceiving data with the one or more electronic devices through the connected communication session. Further, the command may further include; an operation of encoding the stored biometric information; an operation of broadcasting the encoded biometric information; and an operation of determining the one or more electronic devices by using a response signal received in response to the broadcasted biometric information.

Meanwhile, the exemplary embodiments disclosed in the specification and drawings are merely presented to easily describe the technical contents of the present disclosure and help the understanding of the present disclosure and are not intended to limit the scope of the present disclosure. Therefore, all changes or modifications derived from the technical idea of the present disclosure as well as the exemplary embodiments described herein should be interpreted to belong to the scope of the present disclosure.

What is claimed is:

1. A method of transceiving data by an electronic device, comprising:
   receiving, by a first electronic device, one or more pieces of biometric information from a user of the first electronic device;
   grouping, by the first electronic device, the received one or more pieces of biometric information, and storing, by the first electronic device, the grouped biometric information;
   searching, by the first electronic device, one or more second electronic devices in response to receipt of first biometric information included in the grouped biometric information, wherein the one or more second electronic devices receive one or more second biometric information inputted to the one or more second electronic devices, and the searching includes broadcasting, by the first electronic device, the grouped biometric information in response to determining that the first biometric information is included in the grouped biometric information;

receiving, by the first electronic device, a broadcast response for the searching from the searched one or more second electronic devices, the broadcast response including the second biometric information inputted to the searched one or more second electronic devices, wherein the broadcast response is transmitted by the one or more second electronic devices in response to determining, by the one or more second electronic devices, that the second biometric information is included in the grouped biometric information broadcasted by the first electronic device and received by the one or more second electronic devices;

in response to receiving the broadcast response from the searched one or more second electronic devices, determining, by the first electronic device, whether each of the one or more second electronic devices is a neighboring device based on the second biometric information included in the received broadcast response;

establishing, by the first electronic device, a communication session with the searched one or more second electronic devices based on the determining; and transceiving, by the first electronic device, data with the one or more second electronic devices via the established communication session.

2. The method of claim 1, wherein the searching the one or more second electronic devices includes:
encoding the grouped one or more pieces of biometric information;
broadcasting the encoded one or more pieces of biometric information; and
wherein the determining whether each of the one or more other second electronic devices is a neighboring device includes determining whether each of the one or more second electronic devices is a neighboring device by using the broadcast response received in response to the broadcasted encoded one or more pieces of biometric information.

3. The method of claim 1, further comprising:
transmitting the stored one or more pieces of biometric information to a server.

4. The method of claim 1, wherein the one or more pieces of biometric information includes intrinsic information for each user, and
includes at least one from among a finger print, a foot print, an iris, a face, a heart rate, brain waves, joints, and a pulse beat.

5. The method of claim 1, wherein the broadcast response is a signal allowing data transception with the one or more second electronic devices.

6. The method of claim 1, wherein the one or more second electronic devices are searched for using at least one from a Simple Service Discovery Protocol (SSDP), a Multicast Domain Name System (MDNS), broadcasting, multicasting, and unicasting.

7. The method of claim 1, further comprising:
when the number of the one or more second electronic devices is two or more, setting data transception by establishing the communication session between the two or more second electronic devices.

8. The method of claim 1, wherein transceiving the data comprising:

receiving a selection of data desired to be transmitted to the one or more second electronic devices; and
if certain one or more pieces of biometric information is received from the one or more second electronic devices, transmitting the selected data to the one or more second electronic devices.

9. A method of transceiving data by an electronic device, the method comprising:
receiving, by a first electronic device, one or more pieces of biometric information from a user of the first electronic device;
grouping, by the first electronic device, the received one or more pieces of biometric information, and transmitting, by the first electronic device, the grouped biometric information to a server;
requesting, by the first electronic device, to the server, the grouped biometric information in response to receipt of first biometric information included in the grouped biometric information, and receiving, by the first electronic device, the requested biometric information;
searching, by the first electronic device, one or more second electronic devices by using the received first biometric information, wherein the one or more second electronic devices receive one or more second biometric information inputted to the one or more second electronic devices, wherein the searching includes broadcasting, by the first electronic device, the grouped biometric information in response to determining that the first biometric information is included in the grouped biometric information;
receiving, by the first electronic device, a broadcast response for the searching from the searched one or more second electronic devices, the broadcast response including biometric information inputted to the one or more second electronic devices, wherein the broadcast response is transmitted by the one or more second electronic devices in response to determining, by the one or more second electronic devices, that the second biometric information is included in the grouped biometric information broadcasted by the first electronic device and received by the one or more other second electronic devices;
in response to receiving the broadcast response from the searched one or more second electronic devices, determining whether each of the one or more second electronic devices is a neighboring device based on the second biometric information included in the received broadcast response; and
transceiving, by the first electronic device, data with the searched one or more second electronic devices by establishing a communication session based on the determining.

10. The method of claim 9, wherein the searching the one or more second electronic devices includes:
encoding the received biometric information;
broadcasting the encoded biometric information; and
wherein the determining whether each of the one or more other second electronic devices is a neighboring device includes determining whether each of the one or more second electronic devices is a neighboring device by using the broadcast response received in response to the broadcasted biometric information.

11. The method of claim 9, wherein the one or more pieces of biometric information includes intrinsic information for each user, and includes at least one from a finger print, a foot print, an iris, a face, a heart rate, brain waves, joints, and a pulse beat.

12. The method of claim 9, wherein the broadcast response is a signal allowing data transception with the one or more second electronic devices.

13. The method of claim 9, wherein the communication session is one of a communication session established through the server and a communication session directly established with the one or more second electronic devices.

14. An electronic device transceiving data, the electronic device comprising:
- a sensor configured to include one or more sensors receiving one or more pieces of biometric information, the electronic device being a first electronic device;
- a storage;
- a processor configured to:
- receive the one or more pieces of biometric information from a user of the first electronic device,
- group the received one or more pieces of biometric information, and store the grouped biometric information in the storage,
- search one or more second electronic devices in response to receipt of first biometric information included in the grouped biometric information, wherein the one or more second electronic devices receive one or more second biometric information inputted to the one or more second electronic devices, wherein the searching includes broadcasting the grouped biometric information in response to determining that the first biometric information is included in the grouped biometric information,
- receive a broadcast response signal for the searching from the searched one or more second electronic devices, the broadcast response including the second biometric information inputted to the searched one or more second electronic devices, wherein the broadcast response is transmitted by the one or more second electronic devices in response to determining, by the one or more second electronic devices, that the second biometric information is included in the grouped biometric information broadcasted by the first electronic device and received by the one or more other second electronic devices,
- in response to receiving the broadcast response from the searched one or more second electronic devices, determine whether each of the one or more second electronic devices is a neighboring device based on the second biometric information included in the received broadcast response, and
- control a connection of a communication session with the searched one or more second electronic devices based on the determination; and
- a communicator configured to transceive data with the one or more second electronic devices via the communication session.

15. The electronic device of claim 14, wherein the processor is further configured to encode the grouped one or more pieces of biometric information, control broadcasting of the encoded one or more pieces of biometric information, and determine whether each of the one or more second electronic devices is a neighboring device by using the broadcast response received in response to the broadcasted encoded one or more pieces of biometric information.

16. The electronic device of claim 14, wherein the processor is further configured to transmit the stored biometric information to a server through the communicator.

17. The electronic device of claim 14, wherein the one or more pieces of biometric information includes intrinsic information for each user, and includes at least one of a finger print, a foot print, an iris, a face, a heart rate, brain waves, joints, and a pulse beat.

18. The electronic device of claim 14, wherein when a number of the one or more second electronic devices is two or more, the processor sets data transception by establishing a communication session between the one or more second electronic devices.

* * * * *